(12) United States Patent
Golan et al.

(10) Patent No.: US 11,934,533 B2
(45) Date of Patent: Mar. 19, 2024

(54) DETECTION OF SUPPLY CHAIN-RELATED SECURITY THREATS TO SOFTWARE APPLICATIONS

(71) Applicant: MICROSOFT TECHNOLOGY LICENSING, LLC, Redmond, WA (US)

(72) Inventors: Oron Golan, Meitar Halamish (IL); Adir Atias, Migdal Ha'Emek (IL); Aviad Pines, Jerusalem (IL); Aviram Fireberger, Karmia (IL)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 258 days.

(21) Appl. No.: 17/354,794

(22) Filed: Jun. 22, 2021

(65) Prior Publication Data

US 2022/0405397 A1 Dec. 22, 2022

(51) Int. Cl.
*G06F 21/64* (2013.01)
*G06F 8/71* (2018.01)
(Continued)

(52) U.S. Cl.
CPC .............. *G06F 21/577* (2013.01); *G06F 8/71* (2013.01); *G06F 21/602* (2013.01); *G06N 20/00* (2019.01); *H04L 9/0643* (2013.01)

(58) Field of Classification Search
CPC ........ G06F 21/577; G06F 8/71; G06F 21/602; G06F 21/64; G06F 21/57; G06F 21/563; G06N 20/00; H04L 9/0643; H04L 63/1433
See application file for complete search history.

(56) References Cited

U.S. PATENT DOCUMENTS 6,986,043 B2    1/2006    Andrew et al.
8,087,006 B2    12/2011    Bendapudi et al.
(Continued)

OTHER PUBLICATIONS

"Argon Security—Holistic Security for Your CI/CD Pipeline", Retrieved From: https://web.archive.org/web/20210411210225/https://argon.io/, Retrieved On: Apr. 11, 2021, 4 Pages.
(Continued)

*Primary Examiner* — Joseph P Hirl
*Assistant Examiner* — Aayush Aryal
(74) *Attorney, Agent, or Firm* — Shook, Hardy & Bacon L.L.P.

(57) ABSTRACT

The disclosure is directed towards the detection of supply chain-related security threats to software applications. One method includes identifying differences between updated source code and previous source. The updated source code corresponds to an updated version of an application. The previous source code corresponds to a previous version of the application. A risk score is determined for the updated version. The risk score is based on a machine learning (ML) risk model. The ML risk model analyzes the differences between the updated source code and the previous source code. A value of the risk score corresponds to potential security threats that are associated with the updated version. The potential security threats are not associated with the previous version of the application. The risk score is provided to interested parties.

20 Claims, 7 Drawing Sheets

(51) Int. Cl.
G06F 21/56 (2013.01)
G06F 21/57 (2013.01)
G06F 21/60 (2013.01)
G06N 20/00 (2019.01)
H04L 9/06 (2006.01)
H04L 9/40 (2022.01)

(56) References Cited

U.S. PATENT DOCUMENTS

| | | | |
|---|---|---|---|
| 9,158,919 | B2 | 10/2015 | Fortier |
| 9,201,642 | B2* | 12/2015 | Fontenot ................. G06F 21/57 |
| 9,274,930 | B2 | 3/2016 | Morrison |
| 2010/0031353 | A1 | 2/2010 | Thomas et al. |
| 2010/0174909 | A1* | 7/2010 | Ashdown .................. H04L 9/14 |
| | | | 713/181 |
| 2017/0109529 | A1* | 4/2017 | Kraft ...................... G06F 21/563 |
| 2017/0249483 | A1* | 8/2017 | Kawazu .................. G06F 21/64 |
| 2018/0032441 | A1 | 2/2018 | De |
| 2020/0364338 | A1* | 11/2020 | Ducau .................... G06N 3/084 |
| 2021/0019418 | A1* | 1/2021 | Peeters .................. G06F 21/572 |
| 2021/0056209 | A1* | 2/2021 | Fox ........................ G06F 21/563 |
| 2022/0067170 | A1 | 3/2022 | Bargury et al. |

OTHER PUBLICATIONS

"False Positive Rate", Retrieved From: https://en.wikipedia.org/wiki/False_positive_rate, Retrieved On: Apr. 11, 2021, 3 Pages.

"Rule-based Machine Learning", Retrieved From: https://en.wikipedia.org/wiki/Rule-based_machine_learning, Retrieved On: Apr. 11, 2021, 2 Pages.

Wang, et al., "Semantics-Aware Machine Learning for Function Recognition in Binary Code", In Proceedings of International Conference on Software Maintenance and Evolution, Sep. 17, 2017, 11 Pages.

Ackerman, et al., "Software Inspections: An Effective Verification Process", In Journal of IEEE Software, vol. 6, Issue 3, May 1989, pp. 31-36.

Allamanis, et al., "A Survey of Machine Learning for Big Code and Naturalness", In Repository of arXiv:1709.06182v1, Sep. 18, 2017, 36 Pages.

Allamanis, et al., "Bimodal Modelling of Source Code and Natural Language", In Proceedings of the 32nd International Conference on Machine Learning, Jul. 6, 2015, 10 Pages.

Allamanis, et al., "Learning to Represent Programs with Graphs", In Repository of arXiv:1711.00740v1, Nov. 1, 2017, 16 Pages.

Alsulami, et al., "Source Code Authorship Attribution Using Long Short-Term Memory Based Networks", In Proceedings of 22nd European Symposium on Research in Computer Security, Sep. 11, 2017, 19 Pages.

Axelsson, et al., "Detecting Defects with an Interactive Code Review Tool Based on Visualisation and Machine Learning", In Proceedings of 21st International Conference on Software Engineering and Knowledge Engineering, Jul. 1, 2009, 6 Pages.

Bacchelli, et al., "Expectations, Outcomes, and Challenges of Modern Code Review", In Proceedings of 35th International Conference on Software Engineering, May 18, 2013, pp. 712-721.

Balachandran, Vipin, "Reducing Human Effort and Improving Quality in Peer Code Reviews using Automatic Static Analysis and Reviewer Recommendation", In Proceedings of 35th International Conference on Software Engineering, May 18, 2013, pp. 931-940.

Bhatia, et al., "Automated Correction for Syntax Errors in Programming Assignments using Recurrent Neural Networks", In Repository of arXiv: 1603.06129v1, Mar. 19, 2016, 11 Pages.

Bielik, et al., "Learning a Static Analyzer from Data", In Proceedings of International Conference on Computer Aided Verification, Jul. 24, 2017, 20 Pages.

Bird, et al., "NLTK: The Natural Language Toolkit", In Proceedings of the 42nd Annual Meeting of the Association for Computational Linguistics, Jul. 21, 2004, 4 Pages.

Boehm, et al., "Software Defect Reduction Top 10 List", In Journal of Computer, vol. 34, Issue 1, Jan. 2001, pp. 135-137.

Caliskan, et al., "When Coding Style Survives Compilation: De-anonymizing Programmers from Executable Binaries", In Proceedings of 25th Annual Network and Distributed System Security Symposium, Feb. 18, 2018, 15 Pages.

Campbell, et al., "Syntax Errors Just Aren't Natural: Improving Error Reporting with Language Models", In Proceedings of the 11th Working Conference on Mining Software Repositories, May 31, 2014, pp. 252-261.

Chollet, Francois, "Keras: Theano-based Deep Learning Library", Retrieved from: https://web.archive.org/web/20150522055317/https://github.com/fchollet/keras, May 22, 2015, 5 Pages.

Fagan, Michael, "Design and Code Inspections to Reduce Errors in Program Development", In IBM Systems Journal, vol. 15, Issue 3, 1976, pp. 182-211.

Gers, et al., "Learning to Forget: Continual Prediction with LSTM", In Proceedings of the 9th International Conference on Artificial Neural Networks, Sep. 7, 1999, pp. 850-855.

Gomes, et al., "An Overview on the Static Code Analysis Approach in Software Development", In Journal of Faculdade de Engenharia da Universidade do Porto, 2009, 16 Pages.

Caliskan-Islam, et al., "De-anonymizing Programmers via Code Stylometry", In Proceedings of the 24th USENIX Security Symposium, Aug. 12, 2015, pp. 255-270.

Iyer, et al., "Summarizing Source Code using a Neural Attention Model", In Proceedings of the 54th Annual Meeting of the Association for Computational Linguistics, vol. 1: Long Papers, Aug. 7, 2016, pp. 2073-2083.

Karpathy, et al., "Deep Visual-Semantic Alignments for Generating Image Descriptions", In Proceedings of the IEEE Conference on Computer Vision and Pattern Recognition, Jun. 7, 2015, pp. 3128-3137.

Kennedy, Niall, "Google Mondrian: Web-based Code Review and Storage", Retrieved From: https://web.archive.org/web/20070903152844/http://www.niallkennedy.com/blog/archives/2006/11/google-mondrian.html, Nov. 30, 2006, 6 Pages.

Kingma, et al., "Adam: A Method for Stochastic Optimization", In Repository of arXiv:1412.6980v1, Dec. 22, 2014, 9 Pages.

Mantyla, et al., "What Types of Defects are Really Discovered in Code Reviews?", In IEEE Transactions on Software Engineering, vol. 35, Issue 3, May 2009, pp. 430-448.

Mikolov, et al., "Distributed Representations of Words and Phrases and their Compositionality", In Proceedings of 27th Annual Conference on Neural Information Processing Systems, Dec. 5, 2013, 9 Pages.

Xue, et al., "Machine-Learning-based Analysis of Program Binaries: A Comprehensive Study", In Journal of IEEE Access, vol. 4, 2016, 25 Pages.

Rabinovich, et al., "Abstract Syntax Networks for Code Generation and Semantic Parsing", In Repository of arXiv:1704.07535v1, Apr. 25, 2017, 11 Pages.

Rosenblum, et al., "Machine Learning-Assisted Binary Code Analysis", Retrieved From: https://www.researchgate.net/publication/228949157_Machine_Learning-Assisted_Binary_Code_Analysis, May 2012, 3 Pages.

Sadowski, et al., "Tricorder: Building a Program Analysis Ecosystem", In Proceedings of 37th IEEE International Conference on Software Engineering, vol. 1, May 16, 2015, pp. 598-608.

Shang, et al., "Automated Phrase Mining from Massive Text Corpora", In Repository of arXiv:1702.04457v1, Feb. 15, 2017, 10 Pages.

Snail, et al., "Microsoft/nni: An open Source AutoML Toolkit for Automate Machine Learning Lifecycle, including Feature Engineering, Neural Architecture Search, Model Compression and Hyper-Parameter Tuning.", Retrieved From: https://github.com/microsoft/nni, Retrieved On: Apr. 11, 2021, 9 Pages.

Srivastava, et al., "Dropout: A Simple Way to Prevent Neural Networks from Overfitting", The Journal of Machine Learning Research, vol. 15, Issue 1, Jun. 2014, pp. 1929-1958.

Sutskever, et al., "Generating Text with Recurrent Neural Networks", In Proceedings of the 28th International Conference on Machine Learning, Jun. 28, 2011, 8 Pages.

(56) References Cited

OTHER PUBLICATIONS

Tovim, Idan B., "Shlomo Kramer is investing in the Israeli Startup that will Prevent the Next SolarWinds case", Retrieved From: https://www.geektime.co.il/argon-raises-4m-seed/, Mar. 16, 2021, 7 Pages.

Tsotsis, Alexia, "Meet Phabricator, The Witty Code Review Tool Built Inside Facebook", Retrieved from: https://techcrunch.com/2011/08/07/oh-what-noble-scribe-hath-penned-these-words/, Aug. 8, 2011, 4 Pages.

Wang, et al., "Bugram: Bug Detection with N-gram Language Models", In Proceedings of the 31st IEEE/ACM International Conference on Automated Software Engineering, Sep. 3, 2016, pp. 708-719.

Ackerman, et al., "Software Inspections and the Industrial Production of Software", In Proceedings of a Symposium on Software Validation: Inspection-Testing-Verification-Alternatives, Oct. 1, 1984, 3 Pages.

"International Search Report and Written Opinion Issued in PCT Application No. PCT/US2022/029669", dated Sep. 1, 2022, 14 Pages.

"AWS CodePipeline", Retrieved from: https://aws.amazon.com/codepipeline/, Retrieved on: Dec. 28, 2022, 6 Pages.

"Code & CI/CD, Built for Teams using Jira", Retrieved from: https://bitbucket.org/product, Retrieved on: Dec. 28, 2022, 12 Pages.

"JFROG Xray", Retrieved from: https://jfrog.com/xray/, Retrieved on: Dec. 28, 2022, 7 Pages.

"Software. Faster.", Retrieved from: https://about.gitlab.com/, Retrieved on: Dec. 28, 2022, 9 Pages.

"The Continuous Integration Platform Preferred by over 1 Million Engineers", Retrieved from: https://circleci.com/, Retrieved on: Dec. 28, 2022, 8 Pages.

"The Only Devops Platform to Control & Secure Your Software Supply Chain", Retrieved from: https://jfrog.com/, Retrieved on: Dec. 28, 2022, 5 Pages.

Gupta, et al., "Intelligent Code Reviews using Deep Learning", In Proceedings of the 24th ACM SIGKDD International Conference on Knowledge Discovery & Data Mining, Aug. 20, 2018, 9 Pages.

\* cited by examiner

DETECTION OF SUPPLY CHAIN-RELATED SECURITY THREATS TO SOFTWARE APPLICATIONS

BACKGROUND

Software packages (e.g., software products or applications) are ubiquitously employed in numerous domains across virtually all human endeavors (e.g., business, entertainment, philanthropic, scholarship, or other such human activity). One characteristic that has contributed to the wide acceptance of software-based tools in our lives is the relative ease, in which updates to a package, are widely deployed. As new features are added to an application, and "bugs" are detected and fixed within the package, a software publisher may distribute application updates to their users. For example, many applications (or "apps") are routinely updated, on an as-needed-basis, by deploying new (or updated) versions of the applications. These updated versions may be automatically "pushed" to one or more (physical or virtual) machines that execute the application. In many instances, unless an end-user actively monitors which version of the application is currently executing, the end-user may not even be aware of such updates. However, each time an application is updated and a new version is deployed, an opportunity for a security threat to be, either intentionally or unintentionally, inserted into the application is presented. As such, unless an end-user is diligent in monitoring the maintenance of their software, the end-user may be unaware of potential security threats inserted into their software-based tools.

The potential for such inserted security threats is increased given the nature of modern software development. Applications may comprise of, or at least be developed based on, numerous components, functions, sub-routines, modules, libraries, data and computational objects/models, databases, code repositories, sub-applications, sub-packages, or the like (collectively referred to as software components, or simply components). As such, applications are now routinely developed and maintained via a "supply chain" of vendors that provide an application's publisher at least portions of the various components. For example, a software publisher may develop an application by sourcing various components from the supply chain. Each component employed in the development of an application may provide an opportunity for including a security threat. Thus, the security of an application is subject to its "weakest link" (either a component or a vendor that has contributed to the component) in the supply chain. Accordingly, each update to each component provides an opportunity for a security threat to be inserted into the application. Furthermore, the dependencies between the components (or the component vendors) of the supply chain may be complex and/or hierarchical. As the architectural details of applications continue towards complexity, the inter- and intra-dependencies of vulnerabilities within the supply chain also trend towards the complex. The complex and/or hierarchical nature of the supply chain renders the detection and mitigation of such security vulnerabilities difficult via manual inspection.

Traditionally, the potential insertion of a security threat into an application, by way of version updates, has been addressed via a "sandbox," or other such confined test-bed environments. However, confined testing environments cannot expose many potential security threats or vulnerabilities. Some security threats will only manifest under unique conditions that any particular sandbox is unlikely to trigger. No software (manual or automatic) tester can anticipate (and thus simulate) each and every condition that an application will be presented with when employed by end-users. As such, malicious actors (with access to at least a portion of the supply chain) may intentionally engineer security threats that are unlikely to manifest within a testing sandbox, but will likely manifest once the application has been widely deployed. For instance, a time-delay may be employed such that a security threat will only be triggered after a sufficiently long time period has expired post installation. Malicious actors may invoke other stealthy mechanisms to intentionally conceal, from conventional application testing environments, the insertion of security threats into an application's supply chain.

SUMMARY

Various aspects of the technology described herein are generally directed to systems, methods, and computer storage media, for among other things, detection of supply chain-related security threats to software applications. One exemplary, but non-limiting method embodiment, may be a method for identifying suspicious application updates. The method may include identifying one or more differences between updated source code and previous source code. The updated source code may correspond to an updated version of an application. The previous source code may correspond to a previous version of the application. A risk score may be determined for the updated version of the application. The risk score may be based on a machine learning (ML) risk model. The ML risk model may analyze the one or more differences between the updated source code and the previous source code. A value of the risk score may correspond to one or more potential security threats that are included in and/or associated with the updated version of the application. The one or more potential security threats may not be included in and/or associated with the previous version of the application. The risk score may be provided to one or more interested parties.

Other embodiments are directed to a system. The system may comprise one or more hardware processors and one or more computer-readable media having executable instructions embodied thereon. When the executable instructions are executed by the one or more processors, the one or more hardware processors may execute actions, operations, or steps for identifying suspicious application updates. The actions may include or comprise identifying one or more differences between updated source code and previous source code. The updated source code may correspond to an updated version of an application. The previous source code may correspond to a previous version of the application. A risk score may be determined for the updated version of the application. The risk score may be based on a machine learning (ML) risk model. The ML risk model may analyze the one or more differences between the updated source code and the previous source code. A value of the risk score may correspond to one or more potential security threats that are included in and/or associated with the updated version of the application. The one or more potential security threats may not be included in and/or associated with the previous version of the application. The risk score may be provided to one or more interested parties.

Still other embodiments are directed to a non-transitory computer-readable storage media. The media may store computer-useable instructions that, when used by one or more computing devices, cause the one or more computing devices to perform actions, operations, and/or steps for identifying suspicious application updates. The actions may comprise and/or include identifying one or more differences between updated source code and previous source code. The updated source code may correspond to an updated version of an application. The previous source code may correspond to a previous version of the application. A risk score may be determined for the updated version of the application. The risk score may be based on a machine learning (ML) risk model. The ML risk model may analyze the one or more differences between the updated source code and the previous source code. A value of the risk score may correspond to one or more potential security threats that are included in and/or associated with the updated version of the application. The one or more potential security threats may not be included in and/or associated with the previous version of the application. The risk score may be provided to one or more interested parties.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The technology described herein is described in detail below with reference to the attached drawing figures, wherein.

DETAILED DESCRIPTION

Figure 1:
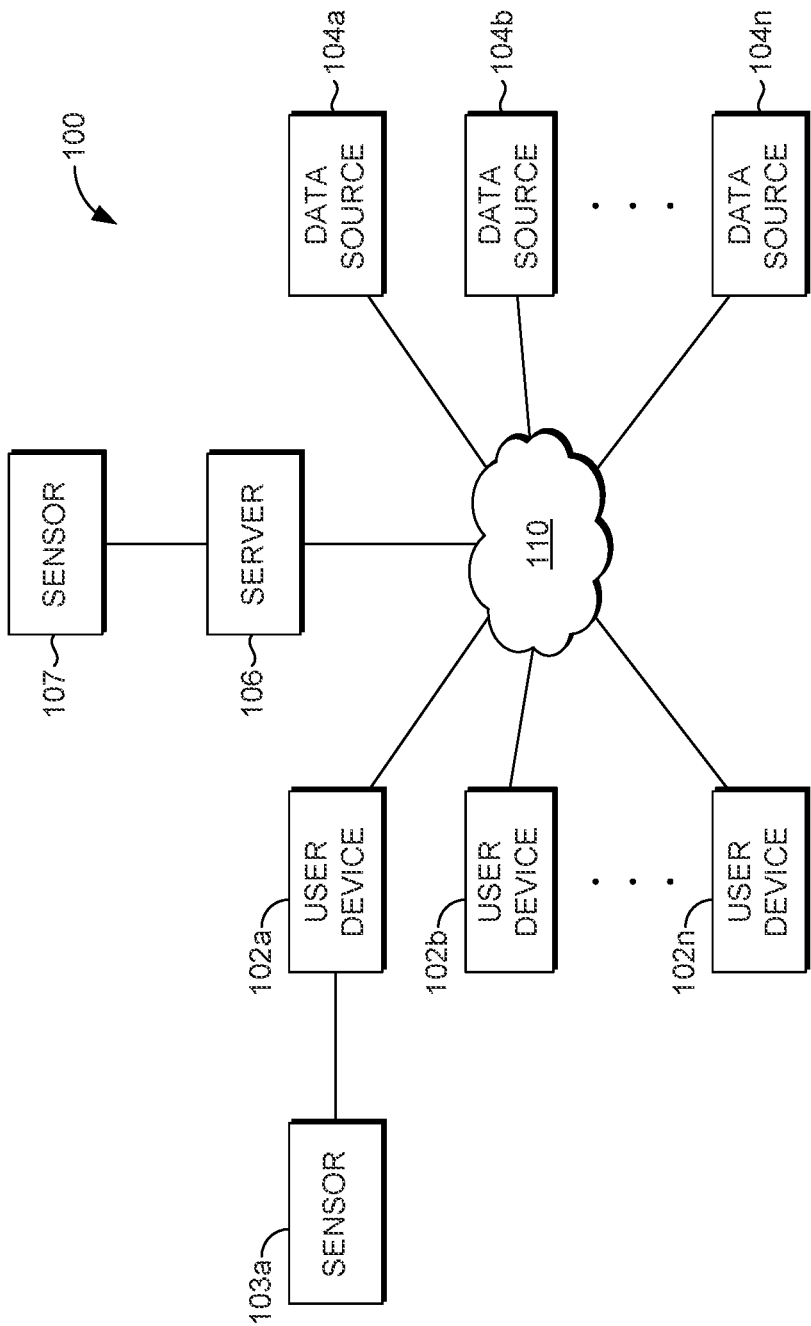
FIG. 1 illustrates a block diagram showing an example operating environment in which some embodiments of the present disclosure may be employed.

Overview of Technical Problems, Technical Solutions, and Technological Improvements As used herein, the term "set" may be employed to refer to an ordered (i.e., sequential) or an unordered (i.e., non-sequential) collection of objects (or elements), such as but not limited to machines (e.g., computer devices), physical and/or logical addresses, graph nodes, graph edges, and the like. A set may include N elements, where N is any non-negative integer. That is, a set may include 0, 1, 2, 3, ... N objects and/or elements, where N is a positive integer with no upper bound. Therefore, as used herein, a set may be a null set (i.e., an empty set), that includes no elements (e.g., N=0 for the null set). A set may include only a single element. In other embodiments, a set may include a number of elements that is significantly greater than one, two, three, or billions of elements. A set may be an infinite set or a finite set. The objects included in some sets may be discrete objects (e.g., the set of natural numbers $\mathbb{N}$). The objects included in other sets may be continuous objects (e.g., the set of real numbers $\mathbb{R}$). In some embodiments, "a set of objects" that is not a null set of the objects may be interchangeably referred to as either "one or more objects" or "at least one object," where the term "object" may stand for any object or element that may be included in a set. Accordingly, the phrases, "one or more objects" and "at least one object" may be employed interchangeably to refer to a set of objects that is not the not null or empty set of objects. A set of objects that includes at least two of the objects may be referred to as "a plurality of objects."

As used herein, the term "subset," is a set that is included in another set. A subset may be, but is not required to be, a proper or strict subset of the other set that the subset is included within. That is, if set B is a subset of set A, then in some embodiments, set B is a proper or strict subset of set A. In other embodiments, set B is a subset of set A, but not a proper or a strict subset of set A. For example, set A and set B may be equal sets, and set B may be referred to as a subset of set A. In such embodiments, set A may also be referred to as a subset of set B. Two sets may be disjoint sets if the intersection between the two sets is the null set.

As used herein, the terms "application" or "app" may be employed interchangeably to refer to any software-based program, package, or product that is executable via one or more (physical or virtual) computing machines or devices. An application may be any set of software products that, when executed, provide an end-user one or more computational and/or data services. In some embodiments, an application may refer to a set of applications that may be executed together to provide the one or more computational and/or data services. The applications included in a set of applications may be executed serially, in parallel, or any combination thereof. The execution of multiple applications (comprising a single application) may be interleaved. For example, an application may include a first application and a second application. An execution of the application may include the serial execution of the first and second application or a parallel execution of the first and second applications. In other embodiments, the execution of the first and second application may be interleaved.

As used herein, the terms "source code" and "code" may be used interchangeably to refer human-readable instructions that at least partially enable the execution of an application. Source code may be encoded in one or more programming languages, e.g., Fortran, C, C++, Python, Ruby, Julia, R, Octave, Java, JavaScript, and the like. In some embodiments, prior to enabling an execution of an application, source code may be subjected to a compilation and/or linking process. As used herein, the term "executable" may refer to any set of machine instructions that instantiate a copy of an application and enable the one or more computing machines (e.g., a physical or virtual machine) to execute, run, or otherwise implement the instantiated application. An application may include a set of executables. An executable may be a binary executable, e.g., a set of executable machine instructions generated via the compilation of human-readable source code (in a programming language) and linking of the binary objects generated via the compilation. That is, an executable for an application may be generated via compiling the source code for the application. Although the embodiments are not so limited, an application may include human-readable source code, e.g., applications generated via interpreted programming languages. For instance, an executable for the application may include the source code for the application. An executable may include one or more binary executables, one or more source code-based executables, or any combination thereof. An executable may include and be dependent upon one or more libraries of functions, objects, or the like. An executable may be encoded in a single file, or the encoding may be distributed across multiple files. That is, an encoding of an executable may be distributed across a plurality of files. The encoding may include one or more data files, where the execution of the application may be dependent upon reading and/or writing to the one or more data files.

Terms such as "decompilation process," "decompilation function," "decompilation method," or "decompiling" may be employed interchangeably to refer to any process that receives, as input, an executable, where at least a portion of the executable is non-readable by a human (e.g., a binary executable), and generates, as output, human-readable source code in one or more programming languages. That is, decompilation may be an inverse function or mapping to that generated by a compiling and/or compilation process.

The terms "static analysis" and "static code analysis" may be used interchangeably to refer to a process that analyzes the source code without executing the source code. Static code analysis may generate a prediction of the results of executing the code (via executing executable of application), without executing the code (or the corresponding executable). In the various embodiments, static code analysis may detect a potential security threat for the source code's application. For example, the static code analysis may detect and/or identify portions of the source code that, if executed, would pose a potential security threat to the platform, system, network, and/or machines that are at least partially enabling the execution of the application. Because the application is not executed via static code execution, the detection and/or identification of the potential security threats, embedded in the source code, do not put the platform, system, network, and/or machines at risk. Static code analysis may be an automatic analysis, a manual analysis, or a combination thereof.

The embodiments herein are directed towards the detection and/or identification of potential security threats in an updated (or current) version of an application. The embodiments employ one or more risk models to automatically analyze one or more differences (at the source code level) between the updated version and a previous version of the application. At least one of the one or more risk models may be a machine learning (ML) risk model that has "learned" patterns in the structure of source code, which may indicate a potential security threat in the new version of the application. For example, differences in portions of the source code relating to user-credential verification may be more likely to indicate a potential security threat than differences in other portions of the source code relating to enabling a user to customize the "look and feel" of a user interface (UI). Based on the analysis of the one or more source code differences, the one or more risk models may assign a risk score to the updated version. If the risk score fails to pass one or more risk score thresholds (e.g., the risk score is above a risk score threshold or cutoff), the updated version may be classified as a potential security threat. In such cases, one or more interventions may be invoked. For example, the updated version may not be published, released, deployed, uploaded, downloaded, installed, launched, implemented, and/or executed. It at least one embodiment, such an intervention may include providing an alert and/or warning that the updated version may include one or more potential security threats. The alert and/or warning may be provided in a risk report. In at least some embodiments, whether or not the updated version is classified as a potential security threat, an application security report for the updated version may be provided. The security report may provide documentation of the one or more differences, a risk analysis of the one or more differences, the risk score, possible interventions, and other such information.

More particularly, when an updated version of the application is released (or ready for release), an executable of the application is received and/or accessed by an application security service. The executable may be received from the application's vendor, developer, publisher, app store, or the like. Such entities that provide an application's executable may be collectively referred herein as a provider of the application (i.e., the application's provider) and/or a source of the application (i.e., the application's source). The executable may be referred to as an updated executable because the executable corresponds to an updated version of the application. If the updated executable is a binary executable, then the executable may be referred to as an updated binary executable. In embodiments where the executable is an updated binary executable, then a decompilation process may be employed to generate source code corresponding to the updated version of the application. That is, a decompilation process may receive the updated binary executable as input, and generate updated source code for the updated versions of the application, as output. In embodiments where the executable includes machine interpretable source code (e.g., an application written in Ruby), the decompilation process may not be required because the source code is readily available. Source code corresponding to a previous version of the application (e.g., previous source code) may be accessed. One or more differences between the previous source code and the updated source code may be determined. A ML risk model may analyze the one or more differences between the updated source code, and the previous source code may be analyzed to determine a risk score for the updated version of the application. The risk score may indicate a level of security risk (or threat) associated with the updated version of the application. The application security service may provide the risk score for the updated version of the application to one or more interested parties. The one or more interested parties may include a developer of the application, a publisher of the application, an end-user of the application, a purchaser of the application, a system administrator that administrates one or more machines that may execute the application, or the like. In some embodiments, an interested party may include one or more entities included in the application's supply chain.

As described throughout, the ML risk model may be trained to detect patterns in the one or more differences that indicate a likelihood for a potential security threat associated with the differences in the source code. For example, differences in components of the application's source code that are related to network functionality and/or operations may be more indicative of security threats than differences in components related to data logging operations. In some embodiments, the ML risk model may be trained via one or more supervised methods, e.g., with labeled training data indicating examples of known security threats and examples of more secure differences in the source code. In other embodiments, the ML risk model may be trained via unsupervised methods (e.g., unsupervised clustering of vector representations of components of source code). In still other embodiments, the ML risk model may be a rule-based ML (RBML) risk model. In some embodiments, when insufficient volumes of labeled training data are available, the ML risk model may initially be a RBML risk model. As examples of security threats in source code are accumulated (e.g., as additional applications with security threats are analyzed by the application security service), a labeled training data set may be generated. A supervised ML risk model may be trained (and re-trained) as the labeled training data is accumulated. During the training period, a combination of the RBML risk model and a semi-trained supervised ML risk model may be employed. Once the performance of the supervised ML risk model begins to outperform the RBML risk model, components of the RBML risk model may be withdrawn from the ML risk model. In embodiments, the ML risk model may include various combinations of supervised ML risk models, unsupervised ML risk models, and/or RBML risk models. The ML risk model may be dynamic, and the combinations of the supervised ML risk models, the unsupervised ML risk models, and/or the RBML risk models may vary over time, as the training of the ML risk models varies over time.

Because the embodiments detect and analyze differences (in the entirety of the source code) between versions of the application, the embodiments are enabled to detect any potential security threat within the entirety of the application's supply chain. Accordingly, the embodiments may be said to be directed towards the detection (and reporting) of supply chain-related security threats in each iterative version of a software-based application. As noted above, conventional approaches to detecting security issues in an application's supply chain tend to be focused on subjecting executions of an updated version of the application to a test-bed such as a contained software sandbox (e.g., a software test-bed). Such testing environments may be enabled to detect trivial and/or naive security threats, but may be significantly less effective at detecting more sophisticated security threats. Such security threats that may not be detected via a conventional test-bed include any security threat that is triggered via one or more conditions that are unlikely to be encountered within the test-bed. Since test-beds are given a finite amount of time to expose security threats, any security threat whose triggering is delayed beyond the finite testing period will not be detected via the test-bed. Furthermore, malicious actors may design triggers for security threats that intentionally are avoided within a test-bed. For example, a security threat may be engineered to detect the constraints of the test-bed (e.g., limited network connectivity or other such constraints). Such security threats may only be triggered when the application is executed outside such a constrained environment as a test-bed or sandbox.

Furthermore, such conventional methods mostly rely on the actual execution of the application (within a constrained testing environment). In contrast, the various embodiments do not execute the updated version of the application. Rather, the embodiments are directed towards analyzing differences in the source code for various versions of the application (without executing the instructions encoded in the source code). Often, conventional methods do not analyze the updated source code for the application. In addition to the ML analysis of the differences in the source code, the various embodiments may employ a static code analysis of the updated source code. Analyzing source code, rather than attempting to trigger security threats within a test-bed, provides various improvements over conventional methods of executing the application under test. As noted throughout, conventional test-beds are unlikely to trigger many sophisticated threats.

Conventional approaches for detecting supply chain-related threats may not employ modern ML techniques, such as supervised learning, unsupervised learning, rule-based learning, or any combination thereof. ML has been shown to be able to learn non-obvious pattern detection beyond the capabilities of mammalian brains. More specifically, the various ML risk models employed in the embodiments may be enabled to detect non-obvious (to a mammalian brain) patterns within the source code (indicative of security threats), of which test-beds or individual humans may not be able to detect. Furthermore, because ML is explicitly employed, a positive feedback loop in the performance of the ML risk model is achieved. That is, as more security threats are detected by the ML risk model, the model may be iteratively trained via supervised learning. Accordingly, the performance of the ML risk model (with respect to detecting potential security threats) may increase over time. Conventional test-bed methods, which do not employ ML risk models, may lack this positive feedback loop resulting in iterative improvements to the risk model's performance.

In still further improvements over conventional methods for detecting security threats in updated applications, such conventional methods rely on the actual detection of a triggered security threat. Thus, conventional test-beds are binary in nature: either a security threat was triggered and detected, or it was not. In contrast, the various embodiments provide a risk score, which may have a probabilistic interpretation. Accordingly, risk assessment provided by the various embodiments may have an analog component (e.g., a risk score corresponding to a probability or likelihood of a potential security threat), and thus a more nuanced risk assessment may be provided by the embodiments.

Additionally, these conventional methods tend to test the updated version, in isolation, without consideration of the differences between the updated version and the previous version of the application. As noted throughout, the various embodiments are directed towards the detection and analysis of differences, at the source-code level, between versions of the application. Conventional methods may not compare consecutive versions of the application, and only test an updated version of the application without consideration of other versions of the application. By iteratively building up a knowledge base and understanding (via ML) of potential security threats within a particular application (as the application is iteratively updated), the performance of the various embodiments may increase over time, and over the course of an application's lifecycle.

In some embodiments, in addition to receiving the updated executable, a digital signature may also be received from the application's provider. The digital signature may correspond to the updated executable. For example, the application's provider may provide a digital signature corresponding to the application's updated executable. As a safeguard for verifying the source of the updated executable, the application security service may authenticate the digital signature corresponding to the updated executable. Such digital signatures and verification of digital signatures may be enabled via one or more asymmetric cryptographic methods, such as but not limited to public/private key cryptography. Prior to receiving the application (e.g., when an earlier version of the application is first received from the application's provider), the application provider may provide the application security service with a copy of an associated public key. The application provider may sign the digital signature with a corresponding private key and a cryptographic algorithm. The application security service may authenticate the digital signature via the public key and the cryptographic algorithm. If the digital signature cannot be authenticated, the application security service may classify the updated version of the application as a potential security threat and/or invoke one or more security-related interventions.

In addition to, or in the alternative to, a digital signature, a cryptographic hash value of the updated executable may be received, e.g., the application's provider may have employed a hash function of sufficient quality to generate a hash value for the updated executable. In at least one embodiment, the cryptographic hash value may be included in the digital signature corresponding to the updated executable. The application security service may employ the updated executable and the hash function to independently generate the hash value. If the independently generated hash value does not match the provided hash value (e.g., because a malicious actor has intentionally altered the updated executable from what the application's provider intended), then the updated executable may be classified as a potential security threat. Again, the application security service may invoke one or more security-related interventions for the potential security threat.

In some embodiments, in addition to the ML-based difference analysis, the updated source code may be subjected to a static code analysis (e.g., an automated analysis performed on the source code without its execution). The static analysis may identify various security threats in the updated source code. In some embodiments, the static analysis may concentrate on the one or more differences between the updated source code and the previous source code. In other embodiments, the static code analysis may analyze the updated source code, line-by-line, without reference to one or more previous versions of the source code. The static code analysis may determine one or more static risk scores for the updated version of the application.

The risk score for the updated application may be based on both the difference risk score (e.g., the risk score determined via the one or more ML risk models) and the static risk score (determined via the one or more static risk models). That is, the overall risk score may be based on a ML-based risk analysis of the one or more differences between the updated source code and the previous source code, as well as the static risk score. The risk score determined by the ML risk model may be referred to as a difference risk score. Note that even in those embodiments where the static code analysis is based on the one or more source code differences, the risk score generated by the static code analysis may be referred to as the static risk score. In some embodiments, the risk score for the updated version of the application may be based on a combination of the difference risk score (generated by the ML-based risk analysis) and the static risk score (generated by the static risk analysis). In some embodiments, the combination of difference and static risk scores may be a linear combination (e.g., linear embodiments). In other embodiments (e.g., non-linear embodiments), the combination may be a non-linear combination of the two risk scores, e.g., a polynomial combination, an exponential combination, or any other non-linear combination.

Overview of Environments for Detecting Security Threats in Updated Applications

Aspects of the technical solution can be described by way of examples and with reference to FIG. 1 and additional illustrations below. FIG. 1 illustrates a block diagram showing an example operating environment 100 in which some embodiments of the present disclosure may be employed. It should be understood that this and other arrangements described herein are set forth only as examples. Other arrangements and elements (e.g., machines, interfaces, functions, orders, and groupings of functions) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by an entity may be carried out by hardware, firmware, and/or software. For instance, some functions may be carried out by a processor executing instructions stored in memory.

Among other components not shown, example operating environment 100 includes a number of user devices, such as user devices 102a and 102b through 102n; a number of data sources, such as data sources 104a and 104b through 104n; server 106; sensors 103a and 107; and communication network 110. It should be understood that environment 100 shown in FIG. 1 is an example of one suitable operating environment. Each of the components shown in FIG. 1 may be implemented via any type of computing device, such as computing device 600 described in connection to FIG. 6, for example. These components may communicate with each other via network 110, which may include, without limitation, a local area network (LAN) and/or a wide area networks (WAN). In exemplary implementations, network 110 comprises the Internet and/or a cellular network, amongst any of a variety of possible public and/or private networks.

It should be understood that any number of user devices, servers, and data sources may be employed within operating environment 100 within the scope of the present disclosure. Each may comprise a single device or multiple devices cooperating in a distributed environment. For instance, server 106 may be provided via multiple devices arranged in a distributed environment that collectively provide the functionality described herein. Additionally, other components not shown may also be included within the distributed environment.

User devices 102a and 102b through 102n can be client devices on the client-side of operating environment 100, while server 106 can be on the server-side of operating environment 100. Server 106 can comprise server-side software designed to work in conjunction with client-side software on user devices 102a and 102b through 102n so as to implement any combination of the features and functionalities discussed in the present disclosure. This division of operating environment 100 is provided to illustrate one example of a suitable environment, and there is no requirement for each implementation that any combination of server 106 and user devices 102a and 102b through 102n remain as separate entities.

User devices 102a and 102b through 102n may comprise any type of computing device capable of use by a user. For example, in one embodiment, user devices 102a through 102n may be the type of computing device described in relation to FIG. 8 herein. By way of example and not limitation, a user device may be embodied as a personal computer (PC), a laptop computer, a mobile or mobile device, a smartphone, a tablet computer, a smart watch, a wearable computer, a personal digital assistant (PDA), a music player or an MP3 player, a global positioning system (GPS) or device, a video player, a handheld communications device, a gaming device or system, an entertainment system, a vehicle computer system, an embedded system controller, a camera, a remote control, a bar code scanner, a computerized measuring device, an appliance, a consumer electronic device, a workstation, or any combination of these delineated devices, or any other suitable computer device.

Data sources 104a and 104b through 104n may comprise data sources and/or data systems, which are configured to make data available to any of the various constituents of operating environment 100; data structures 120, 140, and 160 described in connection to system 200 described in connection to FIG. 2. Data sources 104a and 104b through 104n may be discrete from user devices 102a and 102b through 102n and server 106 or may be incorporated and/or integrated into at least one of those components. In one embodiment, of data sources 104a through 104n comprise sensors 103a, 107, which may be integrated into or associated with the user device(s) 102a, 102b, or 102n or server 106. Examples of sensed user data made available by data sources 104a through 104n may include events.

Figure 2:
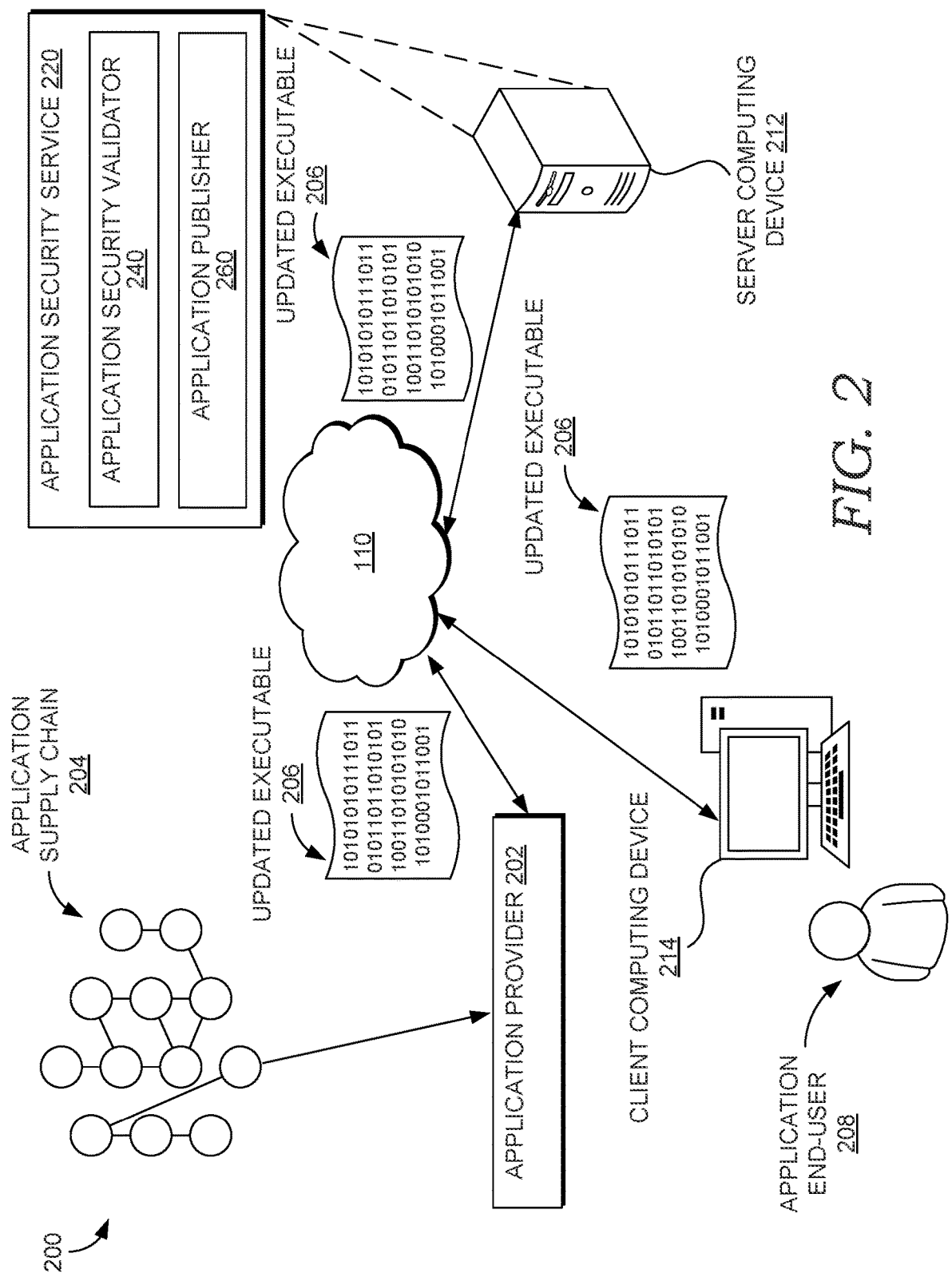
FIG. 2 illustrates a block diagram showing an example security threat detection system in which some embodiments of the present disclosure may be employed.
Figure 3:
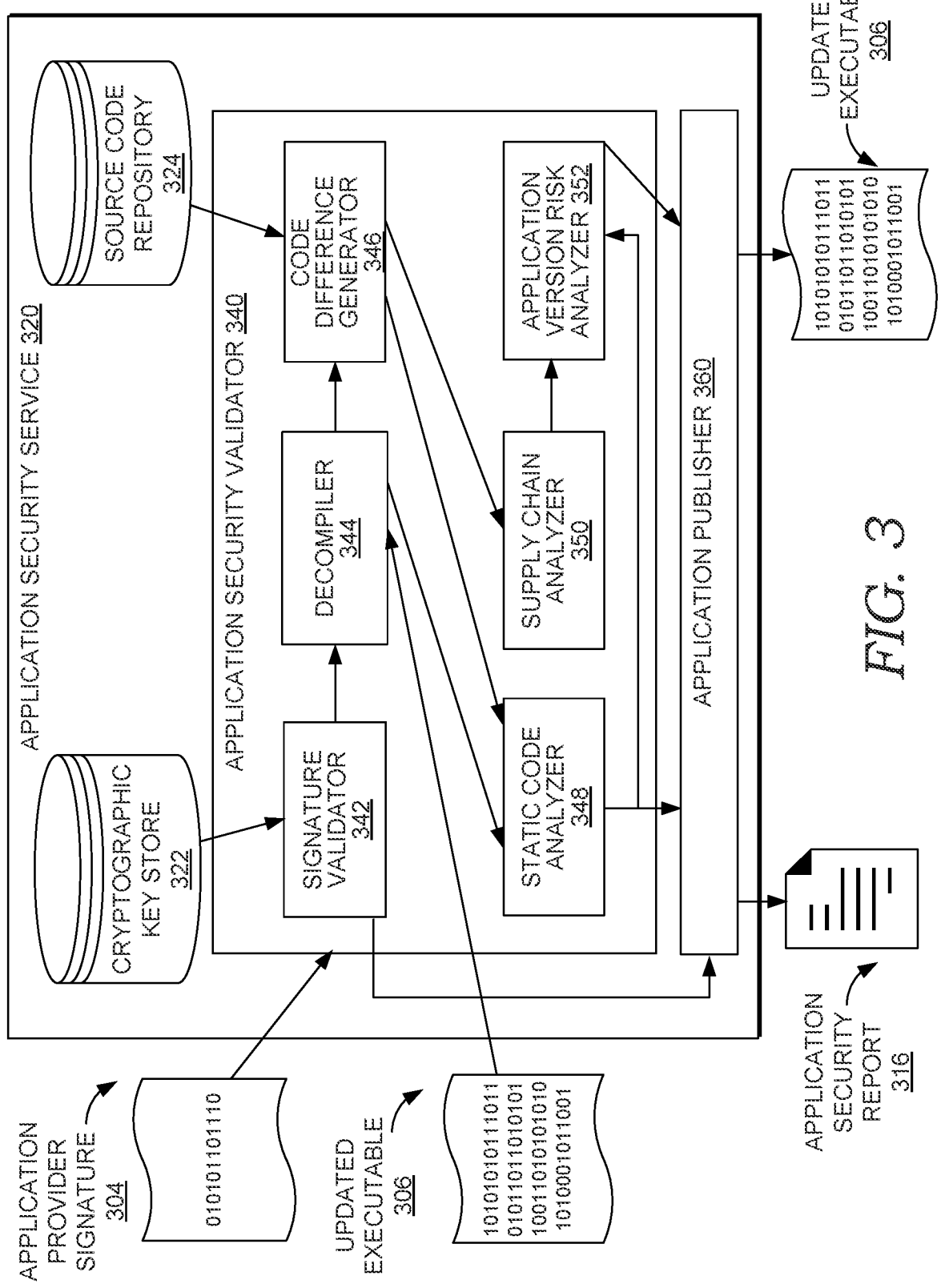
FIG. 3 illustrates a block diagram showing an example application security service that is consistent with the various embodiments.

Operating environment 100 can be utilized to implement a component of the components of application security service 220, described in FIG. 2, and/or application security service 320 of FIG. 3, including components for automatically detecting and identifying events or issues related to supply-chain related security threats to software applications. Operating environment 100 also can be utilized for implementing aspects of workflows 400 and 440 of FIGS. 4A-4B and/or method 500 of FIG. 5.

Overview of Example Security Threat Detection Systems

FIG. 2 illustrates a block diagram showing an example security threat detection system 200 in which some embodiments of the present disclosure may be employed. System 200 may be implemented via one or more components of environment 100 of FIG. 1. Security threat detection system 200 may include an application provider 202, an application security service 220, and a client-computing device 214. One or more physical or virtual computing machines, such as but not limited to server computing device 212, may implement the application security service 220. The application provider 202, the server computing device 212, and the client-computing device 21 may be commutatively coupled via the communication network 110. An application end-user 208 may employ client-computing device 214 to use an application, which may or may not be installed on and/or implemented by client-computing device 214. System 200 may also include an application supply chain 204, which contributes to the development of the application.

As discussed throughout, application security service 220 provides security services for updates to an application. The provided security services may include determining whether the updated version of application poses one or more significant security risks or threats. The application security service 200 provides an end-to-end fully automated pipeline and/or workflow that quantifies a level of security risk or threat posed by an updated versions of the application, relative to one or more previous versions of the application. The quantification of the level of security risk is quantified via one or more security risk scores.

More particularly, the application security service 220 analyzes the updated application to determine one or more risk scores for the updated application. A risk score may be a scalar value or a multi-value object (e.g., a n-tuple or array of values). The determination of whether the updated version of the application poses a significant security risk may be based on one or more risk threshold tests applied to the risk score, where the level of "significance" of the security threat is quantified via the risk scores and risk score thresholds. For example, if at least one of the one or more values of the risk score is greater than one or more risk score thresholds, then the application security service 220 may classify the updated version of the application as posing a significant security threat. If the updated version of the application passes the one or more risk score threshold tests, then the application security service 220 may classify the updated version of the application as not posing a significant security threat. If the application security service 220 classifies the updated version of the application as not posing a significant security threat, then the updated version of the application may be said to have been validated and/or verified. If the updated version of the application has been validated and/or verified, then the application security service 220 may publish the updated version of the application. In some embodiments, publishing the updated version of the application may include making one or more copies of the updated version of the application available to one or more interest parties and/or computing machines or devices. The application security service 220 may generate one or more application security reports for the updated version of the application.

More particularly, when an application is updated and ready to be released and/or published, the application provider 202 may provide the system 200, via communication network 110, with an updated executable 206 for the application. As shown in in FIG. 2, the updated executable 206 is an updated binary executable. However, the embodiments are not so constrained, and the updated executable 206 may include human-readable source code. Application security service 220 may receive and/or access a copy of the updated executable 206, via the communication network 110 and one or more computing devices (e.g., server computing device 212 implementing the application security service 220). In some embodiments, application provider 202 may provide the updated executable 206 directly to the application security service 220. In other embodiments, application provider 202 may provide the updated executable 206 to another party and/or device (e.g., the application end-user 208, the client-computing device 214, a systems administrator that is administrating a system employed by the application end-user 208, a cloud-based service that provides the application as software-as-a-service (SAAS) to the application end-user 208, or the like). In such embodiments, before downloading and/or installing the updated executable 206, the other party may provide the updated executable 206 to the application security service 220. In at least one embodiment, during transit to the other party, the application security service 220 may automatically intercept the updated executable 206, via one or more proxy services. The application security service 200 incepts the updated executable 206, such that the other party does not receive the copy of the updated executable 206 prior to the application security service 220 determining that the updated executable 206 does not pose a significant security threat. If the application security service 220 determines that the updated executable 206 poses a significant security risk, then the application security service 220 may invoke one or more interventions.

Via its fully automated pipeline, the application security service 220 analyzes the updated executable 206 to determine one or more risk scores for the updated executable 206. Based on the one or more risk score and one or more risk score threshold tests, the application security service may classify the updated executable 206 as not posing a significant security threat or as posing a significant security threat. If the updated executable 206 does not pose a significant security threat, then the application security service 220, then the application security service 220 may validate/verify and publish the updated executable 206. Note that the determination of whether the updated executable 206 poses a significant security risk may be based on the specific values of the one or more risk score thresholds. Such risk score thresholds may vary across the embodiments, e.g., the values of the risk scores may be chosen by an operator and/or user of the application security service 220. Publishing the updated executable 206 may include forwarding, pushing, or otherwise making a copy of the updated executable 206 available to one or more interested parties and/or devices by way of the communication network 110. For example, FIG. 2 illustrates a copy of the updated executable 206 being forwarded or pushed to client-computing device 214.

Various embodiments of the application security service 220 and its automated pipeline and/or workflow are discussed at least in conjunction with FIG. 3. However, briefly here, application security service 220 may include an application security validator 240 that is generally responsible for validating and/or verifying the security of the updated executable 206. Furthermore, the application security service 240 may include an application publisher 260 that is generally responsible for publishing and/or releasing the validated updated executable 206.

Overview of Example Application Security Services

FIG. 3 illustrates a block diagram showing an example application security service 320 that is consistent with the various embodiments. Application security service 320 may be similar to application security service 220 of FIG. 2. As such, application security service 320 may include an application security validator 340 and an application publisher 360. Application security validator 340 may be similar to application security validator 240 of application security service 220, and application publisher 360 may be similar to application publisher 260 of application security service 220.

Application security service 320 is enabled to detect and/or identify one or more potential security threats in an updated (or current) version of an application. The application security service 320 employs one or more risk models to automatically analyze one or more differences (at the source code level) between the updated version and a previous version of the application. At least one of the one or more risk models includes one or more static risk models. The one or more static risk models are enabled to identify or detect potential security risks encoded in the source code. One or more static risk scores may be assigned to the updated (or current) version of the application based on the analysis of the one or more static risk models.

At least another of the one or more risk models includes one or more machine learning (ML) risk models that have "learned" patterns (e.g., the ML models are trained via ML methods) in the structure of source code, which may indicate one or more potential security threats in the updated version of the application. For example, differences in portions of the source code relating to user-credential verification may be more likely to indicate a potential security threat than differences in other portions of the source code relating to enabling a user to customize the "look and feel" of a user interface (UI). Based on the difference analysis of the one or more source code differences, the one or more ML risk models may assign one or more difference risk scores to the updated version. The one or more static risk scores may be combined with the one or more difference risk scores to generate one or more risk scores for the updated version of the application.

If the one or more risk score fail to pass one or more risk score thresholds (e.g., the risk score is above a risk score threshold or cutoff), the application security validator 340 fail to validate, verify, and/or authenticate the new version of the application. That is, the application security validator 340 may classify the updated version as including one or more significant security threats. In such cases, the application publisher 360 may invoke one or more interventions. For example, the application publisher 360 may not publish, release, deploy, and/or upload the updated version of the application to other parties. That is, when the application security service 320 fails to validate, verify, and/or authenticate the new version of the application, the application security service 320 may quarantine the updated version of the application. It at least one embodiment, such an intervention may include providing an alert and/or warning that the updated version may include one or more potential security threats. The alert and/or warning may be provided in a risk report. In at least some embodiments, whether or not the updated version is validated, verified, and/or authenticated, the application publisher 360 may generate and provide an application security report for the updated version may be provided. The security report may provide documentation of the one or more differences, a risk analysis of the one or more differences, the risk score, possible interventions, and other such information.

Application security service 320 may receive an updated (or current) executable (e.g., updated binary executable 306) for an updated (or current) version of the application. In addition to the updated (or current) executable 306, the application security service 320 may receive a digital signature 304 for the updated (or current) executable 306. The party that provided the updated (or current) executable 306 (e.g., application provider 202 of FIG. 2) may have signed the updated (or current) executable 306 via the digital signature 304. Accordingly, the digital signature 304 may be referred to as the application provider signature 304. In some embodiments, the application provider may also provide a hash value of the updated executable 306 to the application security service 320. The hash function may have been generated by a suitable hash function. The application security service 320 also has access to the hash function and is enabled to independently calculate the hash value of the updated (or current) executable 306 via the hash function. In at least one embodiment, the hash value of the updated (or current) executable is embedded in the application provider signature 304. In other embodiments, the hash value is provided via other means. The application security validator 340 is generally responsible for validating and/or verifying the security of the updated (or current) executable 306. The application publisher 360 is generally responsible for publishing and/or releasing the validated updated (or current) executable 306, when the application security service 320 has determined that the updated (or current) executable is free of significant security threats. If application security service 320 determines that the updated (or current) executable 306 likely includes one or more significant security threats, then the application publisher 360 may perform one or more interventions, such as but not limited to quarantining the updated (or currant) executable 306. The application publisher 360 may additionally generate and/or make available an application security report 316. It at least one embodiment, such an intervention may include providing an alert and/or warning that the updated version may include one or more potential security threats. The alert and/or warning may be provided in the application security report 316. The application security report 316 may detail the risk analysis performed on the updated (or current) version of the application, as well as document each of the potential security threats or risks detected via the risk analysis.

As shown in FIG. 3, application security service 320 may additionally include a cryptographic key store 322 and a source code repository 324. Cryptographic key store 322 is generally responsible for storing cryptographic keys associated with each application provider (e.g., a public key for each party that provides executables to the application security provider 320). Source code repository 324 acts as a database that stores the source code for each version of each application that is validated by the application security service 320.

Application security validator 340 may include a signature validator 342, a decompiler 344, and a code difference generator 346. Application security service 320 may additionally include a static code analyzer 348, a supply chain analyzer 350, and an application risk version analyzer 352. Signature validator 342 is generally responsible for validating, verifying, and/or authenticating the application provider signature 304. The cryptographic key required to validate, verify, and/or authenticate the digital signature may be retrieved from the cryptographic key store 322. In some embodiments, the signature validator 342 is also responsible for validating, verifying, and/or authenticating the hash value for the updated executable 306 that is provided to the application security validator 340. When the updated executable 306 is a binary executable, the decompiler 344 is generally responsible for generating updated source code for the updated version of the application via a decompilation process applied to the binary executable. The code difference generator 346 is generally responsible for accessing and/or retrieving previous source code that corresponds to a previous version of the application. In some embodiments, the code difference generator 346 retrieves and/or accesses the previous source code from the source code repository 324. The code difference generator 346 may determine one or more differences between the updated source code and the previous source code.

The static code analyzer 348 is generally responsible for performing a static code analysis on the updated source code. The static code analysis may be based on a static risk model. In some embodiments, the static code analysis generates a static risk score for the updated source code. In some embodiments, the updated source code is analyzed, via the static risk model, in isolation from previous source code corresponding to any previous versions of the application. In other embodiments, the static risk analysis is directed towards the one or more differences between the updated source code and the previous source code. Based on the static code analysis, the static code analyzer 348 may determine a static risk score for the updated version of the application.

The supply chain analyzer 350 is generally responsible for employing the one or more ML risk models to analyze the one or more differences between the updated source code and the previous source code. The supply chain analyzer 350 may determine one or more difference risk scores for the updated version of the application based on the one or more ML risk models analyzing the one or more differences between the updated source code and the previous source code. The application version risk analyzer 352 is generally responsible for determining a risk score for the updated version of the application. In some embodiments, the risk score is based on a combination of the one or more static risk scores and the one or more difference risk scores. In other embodiments, the risk score is based on only one of the static risk score or the difference risk score.

When an updated version of the application is released (or ready for release), the application security service 320 receives and/or accesses an executable of the updated application (e.g., updated executable 306). The updated executable 306 may be received from the application's vendor, developer, publisher, app store, or the like (e.g., application provider 202 of FIG. 2). The signature validator 342 may validate, verify, and/or authenticate a digital signature (e.g., application provider signature 304) associated with the application provider and/or a hash value associated with the updated executable 306. When the updated executable 306 is an updated binary executable, then the decompiler 344 may employ a decompilation process to generate source code corresponding to the updated executable 306. That is, a decompilation process may receive the updated binary executable 306 as input, and generate updated source code for the updated versions of the application, as output. In embodiments where the executable includes machine interpretable source code (e.g., an application written in Ruby), the functionality of the decompiler 344 may not be required. The code difference generator 346 may access and/or retried source code corresponding to a previous version of the application (e.g., previous source code). The previous source code may be retrieved from the source code repository 324. The code difference generator 346 may determine, detect, and/or identify one or more differences between the previous source code and the updated source code may be determined.

The supply chain analyzer 350 may employ one or more ML risk models to analyze the one or more differences between the updated source code and the previous source code. Based on at least this difference analysis, the application version risk analyzer 352 may determine one or more risk scores for the updated version of the application. The one or more risk scores may indicate a level of security risk (or threat) associated with the updated version of the application. The application publisher 360 may provide the risk score for the updated version of the application to one or more interested parties. The one or more interested parties may include a developer of the application, a publisher of the application, an end-user of the application, a purchaser of the application, a system administrator that administrates one or more machines that may execute the application, or the like. In some embodiments, an interested party may include one or more entities included in the application's supply chain.

As described throughout, the one or more ML risk models may be trained to detect patterns in the one or more differences that indicate a likelihood for a potential security threat associated with the differences in the source code. For example, differences in components of the application's source code that are related to network functionality and/or operations may be more indicative of security threats than differences in components related to data logging operations. In some embodiments, the one or more ML risk models may be trained via one or more supervised methods, e.g., with labeled training data indicating examples of known security threats and examples of more secure differences in the source code. In other embodiments, the one or more ML risk models may be trained via unsupervised methods (e.g., unsupervised clustering of vector representations of components of source code). In still other embodiments, the one or more ML risk models may include one or more rule-based ML (RBML) risk models. In some embodiments, when insufficient volumes of labeled training data are available, at least one of the one or more ML risk models may initially be a RBML risk model. As examples of security threats in source code are accumulated (e.g., as additional applications with security threats are analyzed by the application security service), a labeled training data set may be generated. A supervised ML risk model may be trained (and re-trained) as the labeled training data is accumulated. During the training period, a combination of the RBML risk model and a semi-trained supervised ML rick model may be employed. Once the performance of the supervised ML risk model begins to outperform the RBML risk model, components of the RBML risk model may be withdrawn from the ML risk model. In some embodiments, the ML risk model may include various combinations of supervised ML risk models, unsupervised ML risk models, and/or RBML risk models. The ML risk model may be dynamic, and the combinations of the supervised ML risk models, the unsupervised ML risk models, and/or the RBML models may vary over time, as the training of the ML risk models varies over time.

In some embodiments, in addition to receiving the updated executable 306, the application security service 320 may receive a digital signature (e.g., application provider signature 304) from the application's provider. The digital signature 304 may correspond to the updated executable 306 and/or the application provider. As a safeguard for verifying the source of the updated executable 306, the signature validator 342 may authenticate the digital signature application provider signature 304. Signature validator 342 may employ one or more asymmetric cryptographic methods, such as but not limited to public/private key cryptography, to validate, verify, and/or verify application provider signature 304. Prior to receiving the updated executable 306 (e.g., when an earlier version of the application is first received from the application's provider), the application provider may provide the application security service 320 with a copy of an associated public key. The application security service may store the provider's public key in the cryptographic key store 322. The application provider may sign the digital signature with a corresponding private key and a cryptographic algorithm. When the updated executable 306 is received, the signature validator 342 may retrieve and/or access the provider's public key from the cryptographic key store 322. The signature validator 342 may then employ the provider's public key to validate, verify, and/or authenticate the application provider signature 304. If the digital signature cannot be authenticated, the application security service may classify the updated executable 306 as including one or more significant security threat and/or invoke one or more security-related interventions.

In addition to, or in the alternative to, a digital signature 304, the application provider may provide a cryptographic hash value of the updated executable 306 to the application security service 320. In some embodiments, the application's provider may have employed a hash function of sufficient quality to generate a hash value for the updated executable 306. In at least one embodiment, the cryptographic hash value may be included in the digital signature 304 corresponding to the updated executable 306. The signature validator 342 may employ the updated executable 306 and the hash function (e.g., the same hash function that the provider employed calculate the hash value) to independently generate the hash value. If the independently generated hash value does not match the provided hash value, then the updated executable 306 may be classified as including a significant security threat. Again, the application security service 320 may invoke one or more security-related interventions for the significant security threat.

In some embodiments, in addition to the ML-based difference analysis, the updated source code may be subjected to a static code analysis (e.g., an automated analysis performed on the source code without its execution). The static code analyzer 348 may employ one or more static code risk models to perform a static code analysis on the updated source code. Via the static risk model, the static code analyzer 348 may identify various security threats in the updated source code. In some embodiments, the static code analysis may concentrate on the one or more differences between the updated source code and the previous source code. In other embodiments, the static code analyzer 38 may analyze the updated source code, line-by-line, without reference to one or more previous versions of the source code. The static code analyzer 348 may determine one or more static risk scores for the updated executable 306.

In some embodiments, the risk score for the updated executable may be based on a combination of the difference risk score (generated by the ML-based risk analysis) and the static risk score (generated by the static risk analysis). The application version risk analyzer 352 may determine the risk score based on a combination of difference and static risk scores. The combination of the difference and static risk scores may be a linear combination (e.g., linear embodiments). In other embodiments (e.g., non-linear embodiments), the combination may be a non-linear combination of the two risk scores, e.g., a polynomial combination, an exponential combination, or any other non-linear combination.

Figure 4A:
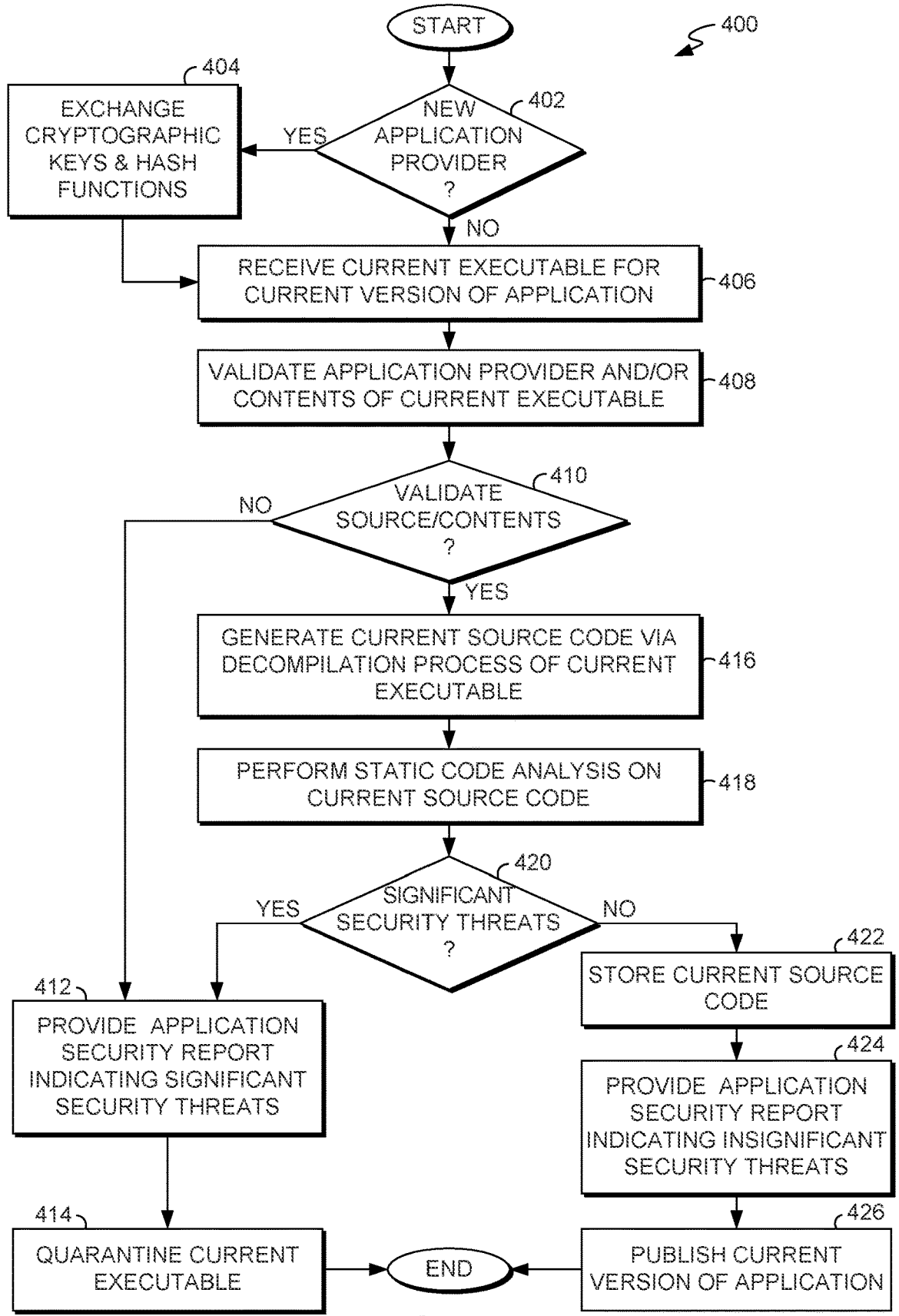
FIG. 4A illustrates an exemplary application security workflow, which is implemented by the application security service of FIG. 3 when an application is to be acquired for a first time.
Figure 4B:
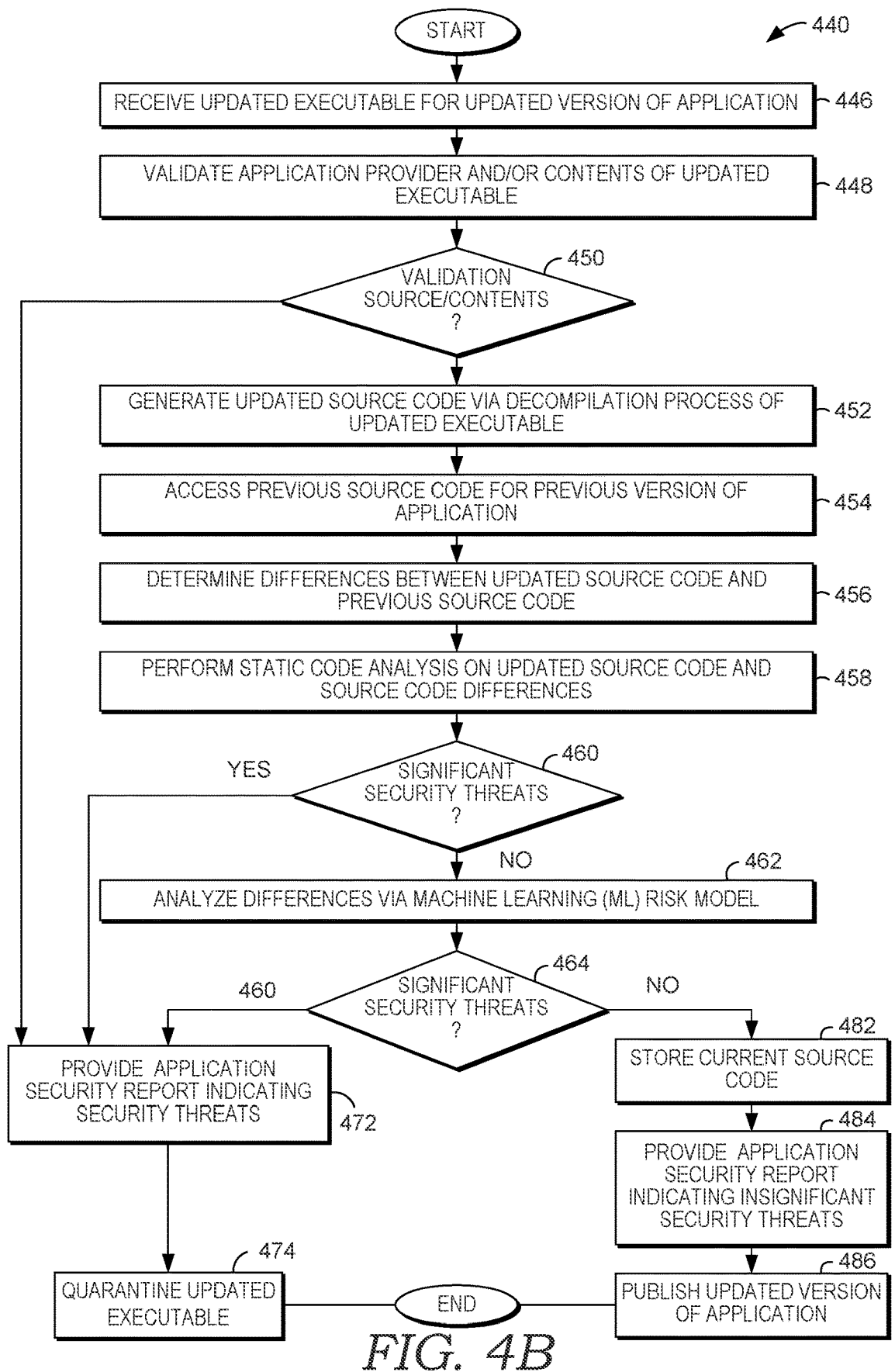
FIG. 4B illustrates another exemplary application security workflow, which is implemented by the application security service of FIG. 3 when an updated version of the application is to be acquired.

Details of the analysis pipeline, or workflow, implemented by the application security service 320 are discussed in conjunction with FIGS. 4A and 4B. FIG. 4A illustrates an exemplary application security workflow 400, which is implemented by the application security service 320 of FIG. 3 when an application is to be acquired for a first time. FIG. 4B illustrates another exemplary application security workflow 440, which is implemented by the application security service 320 of FIG. 3 when an updated version of the application is to be acquired. The first time the application security service 320 attempts to validate any version of a particular application, the application security service 320 may implement workflow 400 of FIG. 4A. After the first time a version of the particular application is validated via workflow 400, application security service 320 may implement workflow 440 to attempt to validate subsequent versions of the particular application. Accordingly, workflow 400 of FIG. 4A will be discussed prior to discussing workflow 440 of FIG. 4B. Furthermore, application security service 320 may implement each of workflows 400 and 440, workflows 400 and 440 are discussed in conjunction with at least FIG. 3.

Workflow 400 begins, after a start block, at decision block 402. If this instantiation of workflow 400 is in response to the first time that a particular application provider (e.g., application provider 202 of FIG. 2) has provided an application for validation, then workflow 400 flows to block 404. If the particular application provider has provided other applications than this new application, then workflow 400 flows to block 406. At block 404, cryptographic keys may be exchanged between the application provider and the application security service 320. In at least one embodiment, the application provider may have signed the application provider signature 304 via asymmetric cryptographic methods. In such embodiments, the application provider may provide the application security service 320 with a copy of their public key at block 404. The application service provider 320 may store a copy of the provider's public key in the cryptographic key store 322. The application provider may also provide the application security service 320 with an indication of a hash function that the provider employs to generate a hash value of executables for applications. Workflow 400 may then proceed to block 406.

At block 406, the application security service 320 may receive a copy of a current executable for a current version of the application. Also at block 406, the application security service 320 may receive the application provider signature 304 and/or the hash value for the current executable. The hash value may have been generated via the hash function indicated in block 404. Note that not all embodiments may include receiving the application provider signature 304 and/or the hash value for the current executable at block 406. For embodiments that do not receive each of the application provider signature 304 and the hash value for the current executable at block 406, workflow 400 may proceed directly to block 416. Otherwise, for embodiments that receive at least one of the application provider signature 304 and/or the hash value for the current executable at block 406, workflow 400 may proceed to block 408. In some embodiments, the application security service 320 may require at least one of the application provider signature 304 and/or the hash value of the current executable. In such embodiments, if the application security service does not receive the required at least one of the application provider signature 304 and/or the hash value of the current executable at block 406, application security service 320 may classify the current executable as including one or more significant security threats. In such scenarios, workflow 400 may proceed directly to block 412.

For embodiments that do receive the application provider signature 304, at block 408, the signature validator 342 may validate, verify, and/or authenticate the application provider signature 304 by employing the provider's public key. In some embodiments, the signature validator 342 may access the cryptographic key store 322 to retrieve or access the provider's public key. In embodiments that receive the hash value for the current executable via block 406, the signature validator 342 may validate, verify, and/or authenticate the hash value for the current executable. For instance, the signature validator 342 may employ the hash function indicated in block 404 to calculate the hash value for the current executable. If the calculated hash value matches the hash value provided in block 406, then the hash value is validated, verified, and/or authenticated. If the two hash values do not match, then then the current executable's hash value has not been validated, verified, and/or authenticated. If either the application provider signature 304 and/or the current executable's hash value fails the validation procedure at block 408, then the application security service 320 may classify the current version of the executable as including a significant security threat.

At decision block 410, workflow 400 may bifurcate based on the validation (or lack thereof) of at least one of the provider's signature 304 and/or the current executable's hash value. If at least one of the provider's signature 304 or the current executable's hash value fails the validation process of block 408, the workflow 400 may proceed to block 412. That is, if either the application provider signature 304 and/or the current executable's hash value fails the validation procedure at block 408, then the application security service 320 may classify the current version of the executable as including a significant security threat. If the current version of the application is determined to include one or more potential security threats, then workflow 400 may proceed to block 412. Otherwise, if the provider's digital signature 304 and/or the current executable's hash value is successfully validated, then workflow 400 may proceed to block 416.

At block 412, the application publisher 360 may generate an application security report 316 that indicates the significant security threats (e.g., the provider's signature 304 and/or the current executable's hash value has failed to be validated) found in application security service's 320 security threat analysis. The application security report 316 may be provided to one or more interested parties. At block 414, the current executable may be quarantined, or otherwise not published by the application publisher 360. After quarantining the current executable of the current version of the application (or performing another intervention), workflow 400 may then terminate.

If at least one of the provider's digital signature 304 and/or the current executable's hash value is validated, then workflow 400 proceeds to block 416, rather than block 412. In embodiments where the current executable includes the current source code for the current version of the application, workflow 400 may proceed directly from block 410 (or block 406) to block 418. For embodiments where the current executable is a binary executable, workflow 400 may proceed to block 416. At block 416, the decompiler 344 may perform a decompilation process of the current executable to generate current source code for the current version of the application. At block 418, the static code analyzer 348 may perform a static code analysis on the current source code. The static code analysis may identify and/or detect one or more potential security threats embedded in the source code. The static code analyzer 348 may determine one or more static risk scores for the current version of the application based on the one or more potential security threats (or lack thereof) detected and/or identified via the static code analysis. At decision block 420, it is determined whether the static code analysis has detected and/or identified any significant security threats in the current source code. The significance of any found security threats may be determined based on the one or more static code threshold tests applied to the one or more static risk scores. For example, a separate static risk threshold value may be applied to each of the one or more static risk scores. If significant security threats have been found in the current source code, via the static analysis, workflow 400 may proceed to block 412, which is described above. At block 412, the application security report 312 may detail the significant security threats found via the static code analysis. If no significant security threats have been found in the current source code via the static code analysis, then workflow 400 may proceed to block 422.

At block 422, the current source code may be stored for later employment. For example, the current source code may be stored in source code repository 324. At block 424, the application publisher 360 may generate an application security report 316 that indicates a lack of significant security threats found in application security service's 320 security threat analysis. In some embodiments, the application security report 316 may indicate any insignificant potential security threats (e.g., potential security threats that results in a non-zero static risk score that is below the static risk threshold value) in the current source code that were detected and/or identified via the static code risk analysis. The application security report 316 may be provided to one or more interested parties. At block 426, the application publisher 360 may publish the current executable. Publishing the current executable may include providing the current executable to one or more interested parties. After publishing the current executable of the current version of the application, workflow 400 may terminate.

Turning our attention to FIG. 4B, workflow 440 begins, after a start block, at block 446. At block 406, the application security service 320 may receive a copy of an updated executable 306 for an updated version of the application. Also at block 446, the application security service 320 may receive the application provider signature 304 and/or the hash value for the updated executable. Note that not all embodiments may include receiving the application provider signature 304 and/or the hash value for the updated executable 306 at block 446. For embodiments that do not receive each of the application provider signature 304 and the hash value for the updated executable 306 at block 446, workflow 440 may proceed directly to block 472. Otherwise, for embodiments that receive at least one of the application provider signature 304 and/or the hash value for the updated executable 306 at block 446, workflow 440 may proceed to block 448. In some embodiments, the application security service 320 may require at least one of the application provider signature 304 and/or the hash value of the updated executable 306. In such embodiments, if the application security service does not receive the required at least one of the application provider signature 304 and/or the hash value of the updated executable 306 at block 446, application security service 320 may classify the updated executable as including one or more significant security threats. In such scenarios, workflow 440 may proceed directly to block 472.

For embodiments that do receive the application provider signature 304, at block 448, the signature validator 342 may validate, verify, and/or authenticate the application provider signature 304 by employing the provider's public key. In some embodiments, the signature validator 342 may access the cryptographic key store 322 to retrieve or access the provider's public key. In embodiments that receive the hash value for the updated executable 306 via block 446, similar to block 408 of workflow 400, the signature validator 342 may validate, verify, and/or authenticate the hash value for the updated executable 306. If either the application provider signature 304 and/or the updated executable's 306 hash value fails the validation procedure at block 448, then the application security service 320 may classify the updated version of the executable as including a significant security threat.

At decision block 450, workflow 440 may bifurcate based on the validation (or lack thereof) of at least one of the provider's signature 304 and/or the updated executable's 306 hash value. If at least one of the provider's signature 304 or the updated executable's 306 hash value fails the validation process of block 448, the workflow 440 may proceed to block 472. That is, if either the application provider signature 304 and/or the updated executable's 306 hash value fails the validation procedure at block 448, then the application security service 320 may classify the updated version of the executable as including a significant security threat. If the updated version of the application is determined to include one or more potential security threats, then workflow 440 may proceed to block 472. Otherwise, if the provider's digital signature 304 and/or the updated executable's 306 hash value is successfully validated, then workflow 440 may proceed to block 472.

At block 472, the application publisher 360 may generate an application security report 316 that indicates the significant security threats (e.g., the provider's signature 304 and/or the updated executable's 306 hash value has failed to be validated) found in application security service's 320 security threat analysis. The application security report 316 may be provided to one or more interested parties. At block 474, the updated executable may be quarantined, or otherwise not published by the application publisher 360. After quarantining the updated executable of the updated version of the application (or performing another intervention), workflow 440 may then terminate.

If at least one of the provider's digital signature 304 and/or the updated executable's 306 hash value is validated, then workflow 440 proceeds to block 452, rather than block 472. In embodiments where the updated executable 306 includes the updated source code for the updated version of the application, workflow 440 may proceed directly from block 450 (or block 446) to block 454. For embodiments where the updated executable 306 is a binary executable, workflow 440 may proceed to block 452. At block 452, the decompiler 344 may perform a decompilation process of the updated executable 306 to generate updated source code for the updated version of the application.

At block 454, previous source code for a previous version of the application is accessed and/or retrieved. The previous version may be the most recent previous version of the application. In other embodiments, the previous version may not be the most recent previous version. The code difference generator 346 may retrieve and/or access the previous source code via the source code repository 324. The previous source code may be the current source code stored in block 422 of workflow 400. At block 456, the code difference generator 346 may determine or generate one or more differences between the updated source code 306 and the previous source code.

At block 458, the static code analyzer 348 may perform a static code analysis on the updated source code 306. As in block 418 of workflow 400, the static code analyzer 348 may perform the static code analysis. In some embodiments, the static code analysis may be based on each of the updated source code 306 and the previous source retrieved at block 454. For example, the static code analysis may be directed towards the one or more differences in the source code determined at block 456. In other embodiments, the static code analysis is based on the only the updated source code 306. For instance, the static code analyzer 348 may analyze the entirety of the updated source code 306. The static code analysis may identify and/or detect one or more potential security threats embedded in the source code. The static code analyzer 348 may determine one or more static risk scores for the updated version of the application based on the one or more potential security threats (or lack thereof) detected and/or identified via the static code analysis. At decision block 460, it is determined whether the static code analysis has detected and/or identified any significant security threats in the updated source code. The significance of any found security threats may be determined based on the one or more static code threshold tests applied to the one or more static risk scores. For example, a separate static risk threshold value may be applied to each of the one or more static risk scores. If significant security threats have been found in the updated source code, via the static analysis, workflow 440 may proceed to block 472, which is described above. At block 472, the application security report 312 may detail the significant security threats found via the static code analysis. If no significant security threats have been found in the updated source code via the static code analysis, then workflow 440 may proceed to block 462.

At block 462, the supply chain analyzer 350 may employ the one or more ML risk models to analyze the one or more differences between the updated source code and the previous source code. As described throughout, the one or more ML risk models may be trained to detect patterns in the one or more differences that indicate a likelihood for a potential security threat associated with the differences in the source code. For example, differences in components of the application's source code that are related to network functionality and/or operations may be more indicative of security threats than differences in components related to data logging operations. The supply chain analyzer 350 may determine one or more difference risk scores for the updated version of the application based on the one or more ML risk models analyzing the one or more differences between the updated source code and the previous source code.

Also at block 462, the application version risk analyzer 352 may determine one or more risk scores for the updated version of the application. The one or more risk scores may indicate a level of security risk (or threat) associated with the updated version of the application. The application version risk analyzer 352 may determine the risk score based on a combination of difference and static risk scores. The combination of the difference and static risk scores may be a linear combination (e.g., linear embodiments). In other embodiments (e.g., non-linear embodiments), the combination may be a non-linear combination of the two risk scores, e.g., a polynomial combination, an exponential combination, or any other non-linear combination. In some embodiments, the application version risk analyzer 352 may determine multiple risk scores based on one or more combinations of the one or more static risk scores and the one or more difference risk scores.

At decision block 464, it is determined whether the ML-based analysis has detected and/or identified any significant security threats in the one or more differences between the updated source code and the previous source code. The significance of any found security threats may be determined based on the one or more risk threshold tests applied to the one or more difference risk scores. For example, a separate difference risk threshold value may be applied to each of the one or more difference risk scores. In some embodiments, one or more threshold tests may be applied to the one or more risk scores determined based on the one or more combinations of the one or more difference risk scores and the one or more static risks scores. If significant security threats have been found in the differences between updated source code and the previous source code, via the ML-based analysis, workflow 440 may proceed to block 472, which is described above. At block 472, the application security report 312 may detail the significant security threats found via the ML-based analysis. If no significant security threats have been found in the updated source code via the ML-based analysis, then workflow 440 may proceed to block 482.

At block 482, the current source code may be stored for later employment. For example, the current source code may be stored in source code repository 324. At block 484, the application publisher 360 may generate an application security report 316 that indicates a lack of significant security threats found in application security service's 320 security threat analysis. In some embodiments, the application security report 316 may indicate any insignificant potential security threats (e.g., potential security threats that results in a non-zero static risk score that is below the static risk threshold value and/or a non-zero difference risk score that is below the difference risk threshold value) in the current source code that were detected and/or identified via the static code risk analysis and/or the ML-based risk analysis. The application security report 316 may be provided to one or more interested parties. At block 486, the application publisher 360 may publish the current executable. Publishing the current executable may include providing the current executable to one or more interested parties. After publishing the current executable of the current version of the application, workflow 440 may terminate.

Figure 5:
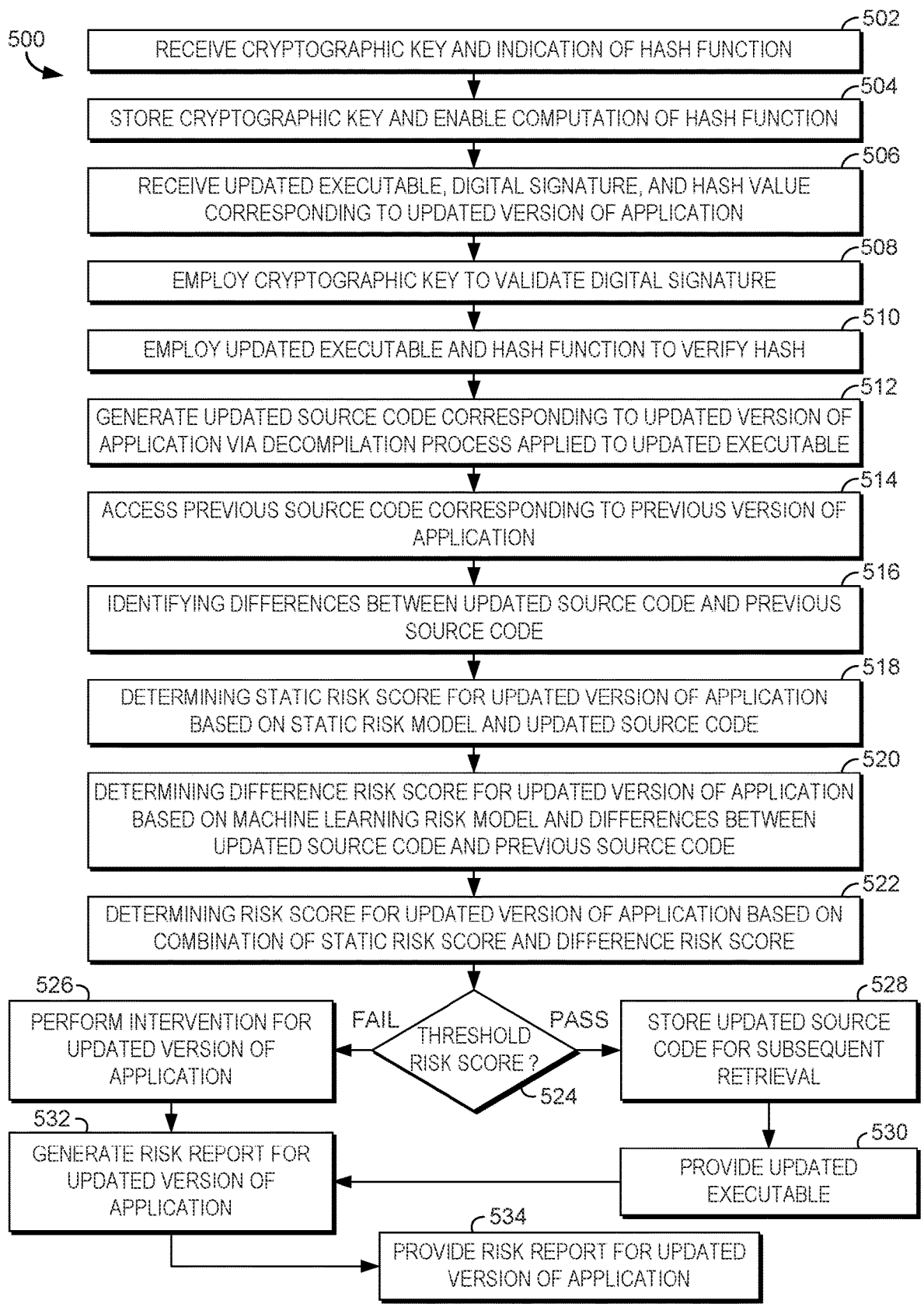
FIG. 5 provides a flow diagram that illustrates a method for detection of supply chain-related security threats to software applications that is consistent with the various embodiments.

Example Methods for Detection of Supply Chain-Related Security Threats to Applications With reference to FIG. 5, a flow diagram is provided illustrating a method for detection of supply chain-related security threats to software applications. The method may be performed using any of the embodiments of an application security service described herein. In embodiments, one or more computer storage media having computer-executable instructions embodied thereon that, when executed, by one or more processors can cause the one or more processors to perform the methods in the storage system.

Turning to FIG. 5, a flow diagram is provided that illustrates a method 500 for detection of supply chain-related security threats to software applications. Generally, the flow diagram of FIG. 5 can be implemented using the architecture described above at least in conjunction with FIGS. 1-3. For example, any suitable combination of portions of method 500 may be implemented by application security service 220 of FIG. 2 and/or application security service 320 of FIG. 3. A computer device, such as but not limited to server computing device 212 of FIG. 2 and/or computing device 600 of FIG. 6 may implement at least portions of method 500.

Initially, method 500 begins at block 502, where a cryptographic key is received. The cryptographic key may be a public key associated with and/or received from an entity associated with one or more versions of an application (e.g., a current version of the application and/or an updated version of the application). The entity may be an application provider. Also at block 502, an indication of a hash function may be received. The hash function may be a message-digest type hash function, such as but not limited to an MD5 hash function. The hash function may be a secure hash function, such as but not limited to a SHA-0, SHA-1, SHA-2, SHA-3, SHA-4, and/or SHA-5 hash function. At block 504, the cryptographic key may be stored and the computation of the hash function may be enabled.

At block 506, an updated executable corresponding to an updated version of an application is received. In various embodiments, the updated executable may be an updated binary executable. The updated executable may be received from an entity, such as an application provider. Also at block 506, a digital signature corresponding to the updated executable may be received. The digital signature may be received from the entity that provided the application. In at least one embodiments, a first hash value corresponding to the updated executable may also be received. The first hash value may be a hash value of the updated executable. The hash value may calculated by employing the contents of the updated executable as an input to the hash function indicated in block 502.

At block 508, the cryptographic key may be employed to validate, verify, and/or authenticate the digital signature. That is, the cryptographic key is employed to confirm and/or verify that the digital signature was signed by the entity that provided the application. The cryptographic key may be retrieved from its storage at block 504. If the digital signature cannot be validated, a notification may be provided to one or more users that the updated version of the application may contain one or more potential security threats because the source of the updated version of the application cannot be validated via its digital signature.

At block 510, the updated executable and the hash function are employed to validate, verify, and/or authenticate the contents of the executable. That is, the first hash value is validated. A second hash value may be calculated by employing the updated executable as input to the hash function. If the second hash value is equivalent to the first hash value, then the contents of the updated executable may be validated. If the second hash value does not match the first hash value, then the contents of the updated executable are not validated. If the contents of the updated executable cannot be validated, a notification may be provided to one or more users that the updated version of the application may contain one or more potential security threats because the contents of the updated executable cannot be validated via an expected hash value.

At block 512, updated source code corresponding to the updated version of the application may be generated. For example, in embodiments where the updated executable is a binary executable, a decompilation process may be applied to the updated binary executable. In embodiments where the updated executable includes the updated source code for the updated version of the application, implementing method 500 may include not executing block 512. At block 514, previous source code corresponding to a previous version of the application is accessed and/or retrieved. At block 516, one or more differences between the updated source code and the previous source code may be identified, detected, and/or determined.

At block 518, one or more static risk scores are determined for the updated version of the application. The one or more static risk scores may be determined based on employing a static risk model to analyze the updated source code. In some embodiments, the static risk model may analyze the one or more differences between the updated source code and the previous source code. Thus, the one or more static risk scores may be based on the previous source code, the updated source code, and/or the one or more differences between the updated source code and the previous source code. Values of the one or more static risk scores may be correlated with and/or corresponding to a likelihood or probability of one or more security threats potentially included in and/or associated with the updated version of the application. For example, the static risk analysis of the updated source code may have detected and/or identified the one or more potential security threats. The values of the one or more static risk scores may correlate with and/or correspond to a classification probability that the updated source code includes one or more security threats. The one or more potential security threats detected and/or identified by the static risk analysis may not be found in and/or associated with the previous version of the application.

At block 520, one or more difference risk scores may be determined for the updated version of the application. The one or more difference risk scores may be based on a machine learning (ML) risk model that analyzes the one or more differences between the updated source code and the previous source code. Values of the one or more difference risk scores may be correlated with and/or corresponding to a likelihood or probability of one or more security threats potentially included in and/or associated with the updated version of the application. For example, the ML-based (or source code difference) risk analysis of the one or more differences between the updated source code and the previous source code may have detected and/or identified the one or more potential security threats. The values of the one or more difference risk scores may correlate with and/or correspond to a classification probability that the updated source code includes one or more security threats. The one or more potential security threats detected and/or identified by the ML-bases risk analysis may not be found in and/or associated with the previous version of the application. The values of the one or more difference risk scores may be based on the one or more sections of the updated source code that are associated with the one or more differences between the updated source code and the previous source code. For examples, differences in the source code in network-related sections or user credential-related sections of the updated source code may result in larger difference risk scores than differences in the source codes in user-interface (UI)-related sections of the updated source code.

In some embodiments, the ML risk model is a source-code classification model that was trained based on labeled training data. The labeled training data may include labeled high-risk source code sections corresponding to a plurality of high-risk updates for one or more other applications. The labeled training data may additionally include labeled low-risk source code sections corresponding to a plurality of low-risk updates for the one or more other applications. In other embodiments, may be a rule-based machine learning (RBML) risk model.

At block 522, one or more (overall) risk scores for the updated version of the application is determined. The one or more (overall) risk scores for the updated version of the application may be based on at least one of the one or more static risks scores, the one or more difference risk scores, and/or one or more combinations of the one or more difference risks scores and the one or more static risk scores. At decision block 524, one or more threshold tests are applied to the one or more (overall) risk scores determined at block 522. If a threshold test of the one or more threshold test fails, then method 500 may flow to block 524. Otherwise, method 500 may flow to block 528.

At block 526, one or more interventions may be performed for the updated version of the application. For example, the updated version may not be published, released, deployed, uploaded, downloaded, installed, launched, implemented, and/or executed. In at least one embodiment, an intervention may include quarantining the updated executable. It at least one embodiment, such an intervention may include providing an alert and/or warning that the updated version may include one or more potential security threats. The alert and/or warning may be provided in a risk report. Method 500 may flow to block 532.

At block 528, the updated source code may be stored for subsequent retrieval and/or accessing. At block 530, the updated executable may be published and/or provided to one or more interested parties. At block 532, and risk report for the updated version of the application may be generated. The risk report may include the one or more static risk scores, the one or more difference risk scores, and/or the one or more (overall) risk scores for the updated version of the application. At block 534, the risk report for the updated version of the application may be provided to one or more interested parties. Providing the risk report may include providing the one or more static risk scores, the one or more difference risk scores, and/or the one or more (overall) risk scores for the updated version of the application to one or more interested parties.

Other Embodiments

The embodiments may be directed towards one or more of methods, system, and/or non-transitory computer readable storage media. One exemplary, but non-limiting method embodiment, may be a method for identifying suspicious application updates. The method may include identifying one or more differences between updated source code and previous source. The updated source code may correspond to an updated version of an application. The previous source code may correspond to a previous version of the application. A risk score may be determined for the updated version of the application. The risk score may be based on a machine learning (ML) risk model. The ML risk model may be employed to analyze the one or more differences between the updated source code and the previous source code. A value of the risk score may correspond to one or more potential security threats that are included in and/or associated with the updated version of the application. The one or more potential security threats may not be included in and/or associated with the previous version of the application. The risk score may be provided to one or more interested parties. In at least one embodiment, based on the risk score being greater than a risk score threshold, an indication that the updated version of the application may include a potential security threat may be provided. Advantageously, by detecting and determining differences between versions of the application using an ML risk model in this way, potential security threats within an application's supply chain, which may include security threats that are able to avoid sandbox detection, are more likely to be detected, thereby resulting in a computer security improvement. Additionally, computer performance for the threat detection made more efficient, as a result of the positive feedback loop from the ML risk model.

In some embodiments, the method may include receiving an updated binary executable. The binary executable may correspond to the updated version of the application. The updated source code corresponding to the updated version of the application may be generated via subjecting the updated binary executable to a decompilation process. The previous source code that corresponds to a previous version of the application may be accessed and/or retrieved. The updated source code may be stored for subsequent accessing.

In at least one embodiment, the method may include receiving a cryptographic key from an entity associated with the updated version of the application. An updated executable that corresponds to the updated version of the application may be received. The updated executable may be received from the entity that is associated with the updated version of the application. A digital signature that corresponds to the updated executable may additionally be received. The cryptographic key may be employed to verify that the digital signature was signed by the entity associated with the application.

In some embodiments, the method further includes determining a static risk score for the updated version of the application. Determining the static risk score may be based on a static risk model that is employed to analyze the updated source code. Determining the risk score for the updated version of the application may be further based on the static risk score.

In other embodiments, the method may further include determining a static risk score for the updated version of the application. In these embodiments, the static risk score may be determined based on the one or more differences between the updated source code and the previous source code. The static risk score may be provided to one or more interested parties.

In at least one embodiment, the method further includes determining a static risk score for the updated version of the application based on the updated source code. A difference risk score for the updated version of the application may be determined. Determining the difference risk score may be based on employing the ML risk model to analyze the one or more differences between the updated source code and the previous source code. The risk score for the updated version of the application may be further based on a combination of the static risk score and the difference risk score.

In various embodiments, the ML risk model may be a source-code classification model. The ML risk model may be trained via supervised learning. The training of the ML risk model may be based on labeled training data. The labeled training data may include labeled high-risk source code. This high risk source code may correspond to a plurality of high-risk updates for one or more other applications. The labelled training data may further include labeled low-risk source code. The low risk source code may correspond to a plurality of low-risk updates for the one or more other applications. In other embodiments, the ML risk model may be a rule-based ML (RBML) model. In at least one other embodiment, the risk score may be further based on one or more sections within the updated source code that are associated with the one or more differences between the updated source code and the previous source code.

In at least one embodiment, the method further includes receiving an indication of a hash function. An updated executable may be received. The updated executable may correspond to the updated version of the application. A first hash value may also be received. The first hash value may correspond to contents the updated executable. A second hash value may be calculated by employing the contents of the updated executable as input to the hash function. The method may further include verifying that the calculated second hash value is equivalent to the received first hash value.

Other embodiments are directed to a system. The system may comprise one or more hardware processors and one or more computer-readable media having executable instructions embodied thereon. When the executable instructions are executed by the one or more processors, the one or more hardware processors may execute actions, operations, or steps for identifying suspicious application updates. The actions may include or comprise identifying one or more differences between updated source code and previous source. The updated source code may correspond to an updated version of an application. The previous source code may correspond to a previous version of the application. A risk score may be determined for the updated version of the application. The risk score may be based on a machine learning (ML) risk model. The ML risk model may be employed to analyze the one or more differences between the updated source code and the previous source code. A value of the risk score may correspond to one or more potential security threats that are included in and/or associated with the updated version of the application. The one or more potential security threats may not be included in and/or associated with the previous version of the application. The risk score may be provided to one or more interested parties. Advantageously, by detecting and determining differences between versions of the application using an ML risk model in this way, potential security threats within an application's supply chain, which may include security threats that are able to avoid sandbox detection, are more likely to be detected, thereby resulting in a computer security improvement. Additionally, computer performance for the threat detection made more efficient, as a result of the positive feedback loop from the ML risk model.

Still other embodiments are directed to a non-transitory computer-readable storage media. The media may store computer-useable instructions that, when used by one or more computing devices, cause the one or more computing devices to perform actions, operations, and/or steps for identifying suspicious application updates. The actions may comprise and/or include identifying one or more differences between updated source code and previous source. The updated source code may correspond to an updated version of an application. The previous source code may correspond to a previous version of the application. A risk score may be determined for the updated version of the application. The risk score may be based on a machine learning (ML) risk model. The ML risk model may be employed analyze the one or more differences between the updated source code and the previous source code. A value of the risk score may correspond to one or more potential security threats that are included in and/or associated with the updated version of the application. The one or more potential security threats may not be included in and/or associated with the previous version of the application. The risk score may be provided to one or more interested parties. Advantageously, by detecting and determining differences between versions of the application using an ML risk model in this way, potential security threats within an application's supply chain, which may include security threats that are able to avoid sandbox detection, are more likely to be detected, thereby resulting in a computer security improvement. Additionally, computer performance for the threat detection made more efficient, as a result of the positive feedback loop from the ML risk model.

Generalized Computing Device

Figure 6:
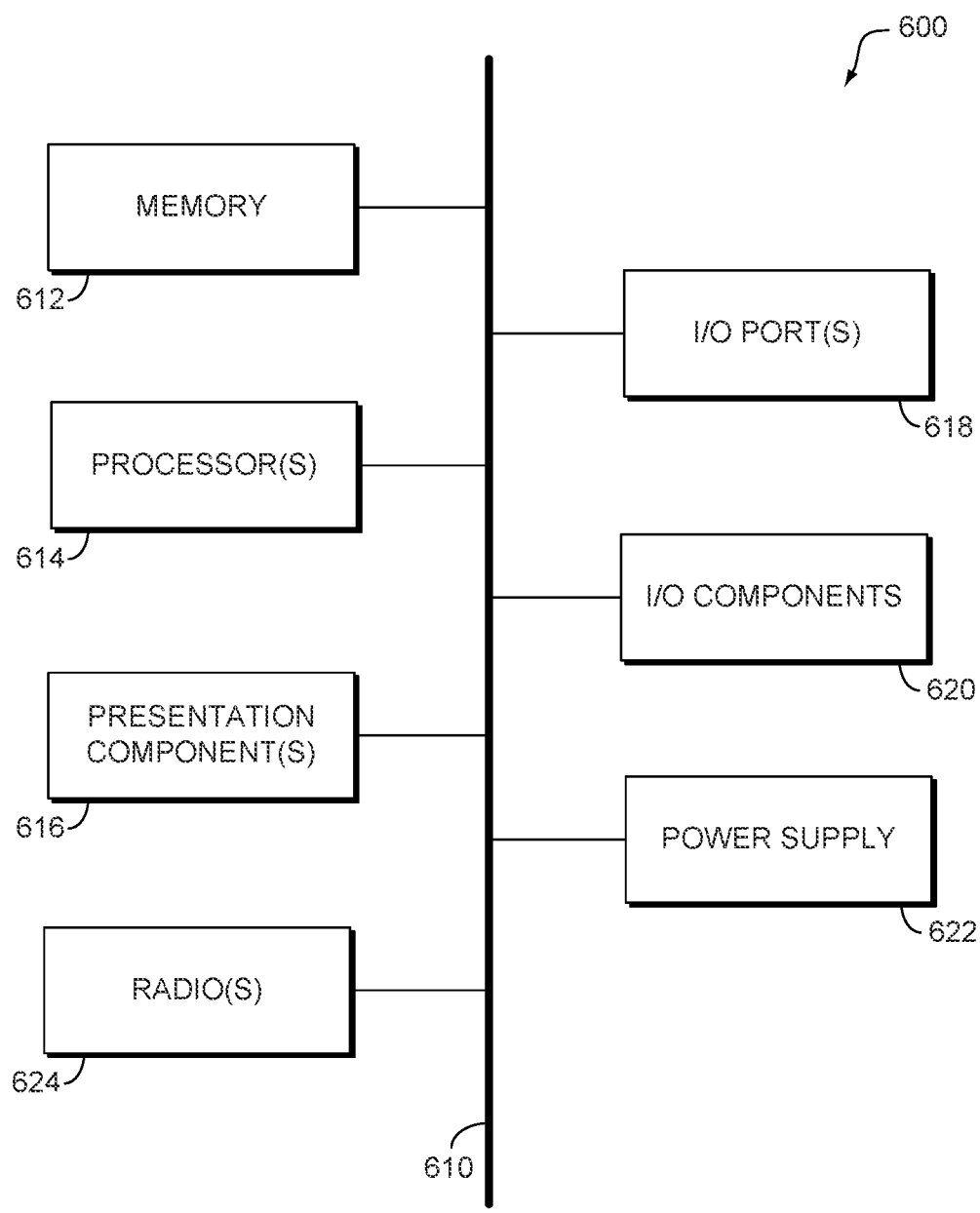
FIG. 6 is a block diagram of an exemplary computing environment suitable for use in implementing aspects of the technology described herein.

With reference to FIG. 6, computing device 600 includes a bus 610 that directly or indirectly couples the following devices: memory 612, one or more processors 614, one or more presentation components 616, one or more input/output (I/O) ports 618, one or more I/O components 620, and an illustrative power supply 622. Bus 610 represents what may be one or more busses (such as an address bus, data bus, or combination thereof). Although the various blocks of FIG. 6 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 6 is merely illustrative of an exemplary computing device that can be used in connection with one or more embodiments of the present disclosure. Distinction is not made between such categories as "workstation," "server," "laptop," "handheld device," etc., as all are contemplated within the scope of FIG. 6 and with reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 612 includes computer storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors 614 that read data from various entities such as memory 612 or I/O components 620. Presentation component(s) 616 presents data indications to a user or other device. Other examples of presentation components may include a display device, speaker, printing component, vibrating component, and the like.

The I/O ports 618 allow computing device 600 to be logically coupled to other devices, including I/O components 620, some of which may be built in. Illustrative components include a microphone, joystick, game pad, satellite dish, scanner, printer, wireless device, etc. The I/O components 620 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 600. The computing device 600 may be equipped with depth cameras, such as stereoscopic camera systems, infrared camera systems, RGB camera systems, and combinations of these, for gesture detection and recognition. Additionally, the computing device 600 may be equipped with accelerometers or gyroscopes that enable detection of motion. The output of the accelerometers or gyroscopes may be provided to the display of the computing device 600 to render immersive augmented reality or virtual reality.

Some embodiments of computing device 600 may include one or more radio(s) 624 (or similar wireless communication components). The radio 624 transmits and receives radio or wireless communications. The computing device 600 may be a wireless terminal adapted to receive communications and media over various wireless networks. Computing device 600 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Many different arrangements of the various components depicted, as well as components not shown, are possible without departing from the scope of the claims below. Embodiments of the disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

With reference to the technical solution environment described herein, embodiments described herein support the technical solution described herein. The components of the technical solution environment can be integrated components that include a hardware architecture and a software framework that support constraint computing and/or constraint querying functionality within a technical solution system. The hardware architecture refers to physical components and interrelationships thereof, and the software framework refers to software providing functionality that can be implemented with hardware embodied on a device.

The end-to-end software-based system can operate within the system components to operate computer hardware to provide system functionality. At a low level, hardware processors execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. As used herein, computer-executable instructions includes any software, including low level software written in machine code, higher level software such as application software and any combination thereof. In this regard, the system components can manage resources and provide services for system functionality. Any other variations and combinations thereof are contemplated with embodiments of the present disclosure.

By way of example, the technical solution system can include an Application Programming Interface (API) library that includes specifications for routines, data structures, object classes, and variables may support the interaction between the hardware architecture of the device and the software framework of the technical solution system. These APIs include configuration specifications for the technical solution system such that the different components therein can communicate with each other in the technical solution system, as described herein.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present disclosure are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present disclosure may generally refer to the technical solution environment and the schematics described herein, it is understood that the techniques described may be extended to other implementation contexts.

Embodiments of the present disclosure have been described in relation to particular embodiments which are intended in all respects to be illustrative rather than restrictive. Alternative embodiments will become apparent to those of ordinary skill in the art to which the present disclosure pertains without departing from its scope.

From the foregoing, it will be seen that this disclosure is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A computer-implemented method for identifying suspicious application updates of an application for publishing by a publisher, the method comprising:
   identifying at least one difference between updated source code and previous source code without executing and prior to publishing the updated source code, the updated source code corresponding to an updated version of the application that has been updated based at least on a component of the updated source code that is received from an entity separate from the publisher, and the previous source code corresponding to a previous version of the application;
   determining a risk score, for the updated version of the application, based on a machine learning (ML) risk model that is employed to analyze the at least one difference between the updated source code and the previous source code, the risk score having a value corresponding to at least one potential security threat that is associated with the updated version of the application and not associated with the previous version of the application; and
   based on the risk score being greater than a risk score threshold, providing an indication that the updated version of the application includes a potential security threat.

2. The method of claim 1, further comprising:
   receiving an updated binary executable that corresponds to the updated version of the application;
   generating the updated source code corresponding to the updated version of the application by applying a decompilation process to the updated binary executable;
   accessing the previous source code that corresponds to a previous version of the application; and
   storing the updated source code for subsequent accessing.

3. The method of claim 1, further comprising:
   receiving a cryptographic key from an entity associated with the updated version of the application;
   receiving an updated executable from the entity associated with the updated version of the application, the updated executable corresponding to the updated version of the application;
   receiving a digital signature that corresponds to the updated executable; and
   employing the cryptographic key to verify that the digital signature was signed by the entity associated with the application.

4. The method of claim 1, further comprising:
   determining a static risk score for the updated version of the application based on a static risk model that is employed to analyze the updated source code; and
   determining the risk score for the updated version of the application further based on the static risk score.

5. The method of claim 1, further comprising:
   determining a static risk score for the updated version of the application based on the at least one difference between the updated source code and the previous source code; and
   providing the static risk score.

6. The method of claim 1, further comprising:
   determining a static risk score for the updated version of the application based on the updated source code;
   determining a difference risk score for the updated version of the application based on the ML risk model that is employed to analyze the at least one difference between the updated source code and the previous source code; and
   determining the risk score for the updated version of the application is further based on a combination of the static risk score and the difference risk score.

7. The method of claim 1, wherein the ML risk model is a source-code classification model that is trained based on labeled training data that includes labeled high-risk source code corresponding to a plurality of high-risk updates for at least one other application and labeled low-risk source code corresponding to a plurality of low-risk updates for the at least one other application.

8. The method of claim 1, wherein the ML risk model is a rule-based ML (RBML) model.

9. The method of claim 1, wherein the risk score is further based on at least one section within the updated source code that are associated with the at least one difference between the updated source code and the previous source code.

10. The method of claim 1, further comprising:
    receiving an indication of a hash function;
    receiving an updated executable that corresponds to the updated version of the application;
    receiving a first hash value corresponding to contents of the updated executable;
    calculating a second hash value by employing the contents of the updated executable as input to the hash function; and
    verifying that the calculated second hash value is equivalent to the received first hash value.

11. The computer-implemented method of claim 1, the updated version and the previous version are sequentially consecutive versions of a plurality of versions of the application.

12. A system comprising:
    at least one hardware processor; and
    at least one computer-readable media having executable instructions embodied thereon, which, when executed by the at least one hardware processor, cause the at least one hardware processor to perform operations comprising:
       identifying at least one difference between updated source code and previous source code without executing and prior to publishing the updated source code, the updated source code corresponding to an updated version of an application that has been updated based at least on a component of the updated source code that is received from an entity separate from a publisher, and the previous source code corresponding to a previous version of the application;

determining a risk score, for the updated version of the application, based on a machine learning (ML) risk model that is employed to analyze the at least one difference between the updated source code and the previous source code, the risk score having a value corresponding to at least one potential security threat that are associated with the updated version of the application and not associated with the previous version of the application; and providing the risk score for the updated version of the application.

13. The system of claim 12, wherein the operations further comprise:

receiving a cryptographic key from an entity associated with the updated version of the application;

receiving an updated executable from the entity associated with the updated version of the application, the updated executable corresponding to the updated version of the application;

receiving a digital signature that corresponds to the updated executable; and employing the cryptographic key to verify that the digital signature was signed by the entity associated with the application.

14. The system of claim 12, wherein the operations further comprise:

determining a static risk score for the updated version of the application based on a static risk model that is employed to analyze the updated source code; and determining the risk score for the updated version of the application further based on the static risk score.

15. The system of claim 12, wherein the operations further comprise:

determining a static risk score for the updated version of the application based on the at least one difference between the updated source code and the previous source code; and providing the static risk score.

16. The system of claim 12, wherein the operations further comprise:

determining a static risk score for the updated version of the application based on the updated source code;

determining a difference risk score for the updated version of the application based on the ML risk model that is employed to analyze the at least one difference between the updated source code and the previous source code; and determining the risk score for the updated version of the application is further based on a combination of the static risk score and the difference risk score.

17. The system of claim 12, wherein the ML risk model is a source-code classification model that is trained based on labeled training data that includes labeled high-risk source code corresponding to a plurality of high-risk updates for at least one other application and labeled low-risk source code corresponding to a plurality of low-risk updates for the at least one other application.

18. At least one computer storage media storing computer-useable instructions that, when used by at least one computing device, cause the at least one computing device to perform operations comprising:

identifying at least one difference between updated source code and previous source code without executing and prior to publishing the updated source code, the updated source code corresponding to an updated version of an application that has been updated based at least on a component of the updated source code that is received from an entity separate from a publisher, and the previous source code corresponding to a previous version of the application;

determining a risk score, for the updated version of the application, based on a machine learning (ML) risk model that is employed to analyze the at least one difference between the updated source code and the previous source code, the risk score having a value corresponding to at least one potential security threat that are associated with the updated version of the application and not associated with the previous version of the application; and providing the risk score for the updated version of the application.

19. The media of claim 18, wherein the risk score is further based on at least one section within the updated source code that are associated with the at least one difference between the updated source code and the previous source code.

20. The media of claim 18, wherein the operations further comprise:

receiving an indication of a hash function;

receiving an updated executable that corresponds to the updated version of the application;

receiving a first hash value corresponding to contents of the updated executable;

calculating a second hash value by employing the contents of the updated executable as input to the hash function; and verifying that the calculated second hash value is equivalent to the received first hash value.

* * * * *